(12) United States Patent
Liu

(10) Patent No.: US 12,065,185 B2
(45) Date of Patent: Aug. 20, 2024

(54) SIDE-OPENING CHILD CAR CHASSIS AND SIDE-OPENING CHILD CAR

(71) Applicant: QINGDAO WOTANDI OUTDOOR CO., LTD., Shandong (CN)

(72) Inventor: Runhu Liu, Shandong (CN)

(73) Assignee: QINGDAO WOTANDI OUTDOOR CO., LTD., Shandong (CN)

( * ) Notice: Subject to any disclaimer, the term of this patent is extended or adjusted under 35 U.S.C. 154(b) by 237 days.

(21) Appl. No.: 17/837,166

(22) Filed: Jun. 10, 2022

(65) Prior Publication Data

US 2023/0365179 A1    Nov. 16, 2023

(30) Foreign Application Priority Data

May 13, 2022 (CN) ......................... 202210523593.4

(51) Int. Cl.
| | |
|---|---|
| B62B 7/06 | (2006.01) |
| B60N 2/28 | (2006.01) |
| B62B 3/02 | (2006.01) |
| B62B 9/14 | (2006.01) |

(52) U.S. Cl.
CPC ................. *B62B 7/06* (2013.01); *B60N 2/28* (2013.01); *B62B 3/025* (2013.01); *B62B 9/142* (2013.01); *B60N 2002/2896* (2013.01)

(58) Field of Classification Search
CPC ........... B62B 7/06; B62B 7/008; B62B 9/142; B62B 9/14; B62B 9/102; B62B 5/061; B62B 5/0013; B62B 5/082; B62B 3/007; B62B 3/025; B62B 2205/22; B62B 2301/05; B60N 2/28; B60N 2002/2896
See application file for complete search history.

(56) References Cited

U.S. PATENT DOCUMENTS

| | | | | |
|---|---|---|---|---|
| 7,523,955 | B2 * | 4/2009 | Blair | B62B 3/007 |
| | | | | 280/47.38 |
| 9,108,656 | B1 * | 8/2015 | Nolan | B62B 3/02 |
| 9,896,118 | B2 * | 2/2018 | Choi | B62B 3/007 |
| 9,969,227 | B1 * | 5/2018 | McNeave | B62B 3/007 |
| 10,081,380 | B2 * | 9/2018 | Fitzwater | B62B 3/007 |

(Continued)

FOREIGN PATENT DOCUMENTS

| | | | |
|---|---|---|---|
| CN | 208119209 U | * | 11/2018 |
| CN | 113879385 A | * | 1/2022 |
| DE | 202019105298 U1 | * | 11/2019 |

*Primary Examiner* — Steve Clemmons
(74) *Attorney, Agent, or Firm* — Li & Cai Intellectual Property (USA) Office

(57) ABSTRACT

A side-opening child car chassis and a side-opening child car refer to a child car technical field. The side-opening child car chassis includes a main load-supporting chassis, car body connection assemblies, stabilizer brackets, a reinforcement member lock device, and an unlock device. The main load-supporting chassis includes a middle protective chassis and a rear chassis and a front chassis that are respectively and rotatably mounted at a front side and a rear side of the middle protective chassis. There are two groups of the stabilizer brackets, one group of the stabilizer brackets is mounted on the left of a bottom portion of the main load-supporting chassis, another group is mounted on the right of the bottom portion of the main load-supporting chassis, each group of stabilizer brackets in an expanded state has a V shape, and a tip faces inwards.

10 Claims, 24 Drawing Sheets

(56) References Cited

U.S. PATENT DOCUMENTS

| | | | |
|---|---|---|---|
| 10,300,934 B2 * | 5/2019 | Ostergaard | B62B 5/082 |
| 10,392,042 B2 * | 8/2019 | Fitzwater | B62B 3/007 |
| 10,414,422 B2 * | 9/2019 | Choi | B62B 9/082 |
| D879,885 S * | 3/2020 | Ostergaard | D21/425 |
| 10,988,153 B1 * | 4/2021 | Horowitz | B62B 7/008 |
| 11,465,665 B2 * | 10/2022 | Sturgeon | B62B 7/062 |
| 2007/0284900 A1 * | 12/2007 | Sze | B62B 3/007 296/26.15 |
| 2022/0135103 A1 * | 5/2022 | Peterson | B62B 3/10 280/47.34 |
| 2023/0040903 A1 * | 2/2023 | Yang | B62B 3/007 |

\* cited by examiner

B

SIDE-OPENING CHILD CAR CHASSIS AND SIDE-OPENING CHILD CAR

FIELD OF THE DISCLOSURE

The present disclosure relates to a child car technical field, and more particularly to a side-opening child car chassis and side-opening child car.

BACKGROUND OF THE DISCLOSURE

A multifunctional child push car, also named parent-child leisure push car, twin children push car, multi-baby push car, and nursery push car, is disposed to be a foldable structure for saving storage space and convenient storage and transportation.

However, a conventional child push car structure, as Chinese Patent Applications disclosed below, Chinese Invention Patent Application with the publication number of CN113511251A, Chinese Invention Patent Application with the publication number of CN113548105A, and Chinese Invention Patent Application with the publication number of CN113879385A, has a chassis having two sides that are primarily made by a load supporting and foldable structure and unable to be used at an open state, thereby unable to satisfy requirements to allow children to get on and off the car from two sides by themselves. The adults are required to carry the children in and out the car from top side, and it's a hard physical test when the children are heavy, or for mother, teacher, or elder required to take care of more than two children at the same time. In addition, the chassis does not have enough strength when the conventional child push car is expanded, thereby not suitable for taking caring of children at the same time and needed to be immediately improved.

SUMMARY OF THE DISCLOSURE

In response to the above-referenced technical inadequacies, the present disclosure provides a side-opening child car chassis and side-opening child car having a chassis that is foldable, and after expanded, the chassis have enough strength, load-supporting ability, and excellent stability and fully satisfies the requirements to allow children to get on and off the car from two sides by themselves.

In one aspect, the present disclosure provides a side-opening child car chassis including a major, four car body connection assemblies, two sets of stabilizer brackets, a reinforcement member locking device, and an unlock device. The main loading-supporting chassis includes a middle protective chassis, a front chassis and a rear chassis. The front chassis and the rear chassis are respectively and rotatably mounted on a front side and a rear side of the middle protective chassis. Each of the front chassis and the rear chassis is configured to vertically rotate around the middle protective chassis, and the front chassis, the rear chassis, and the middle protective chassis are arranged at a same level after the front chassis and the rear chassis are expanded. Two of the four car body connection assemblies are respectively and rotatably connected to a left end and a right end of a front side of the front chassis, and another two of the four car body assemblies are respectively and rotatably connected to a left end and a right end of a rear side of the rear chassis. Each of the front chassis and the rear chassis is configured to vertically rotate around corresponding car body connection assemblies. One set of the stabilizer brackets is mounted on a left side of a bottom portion of the main load-supporting chassis, another set of the stabilizer brackets is mounted on a right side of the bottom portion of the main load-supporting chassis, each of the two sets of stabilizer brackets in an expanded state has a V shape a tip facing inwards. Each set of the stabilizer brackets includes two reinforcement rods hinged to each other, one end of one of the reinforcement rods is rotatably connected to one of the car body connection assemblies connected to the front side of the front chassis, one end of another one of two the reinforcement rods is rotatably connected to one of the two car body connection assemblies connected to rear side of the rear chassis, and the two reinforcement rods are configured to horizontally rotate around corresponding car body connection assemblies. The reinforcement member locking device is disposed at a hinge position between the middle protective chassis and the reinforcement rods and configured to lock the reinforcement rods at a bottom side of the middle protective chassis. The unlocking device is configured to control the reinforcement member locking device to lock or to unlock.

Preferably, the two sets of the stabilizer brackets have a height difference therebetween so as to prevent the two sets of the stabilizer brackets from interfering with each other when the side-opening child car chassis is folded.

Preferably, each of a left side and a right side of the middle protective chassis has a limiting block disposed thereon so as to correspondingly cover a rotation part of each of the front chassis and the rear chassis, and an upper side of the limiting block is sealed and a lower side of the limiting block is open so as to prevent each of the front chassis and the rear chassis from rotating upwards relative to the middle protective chassis.

Preferably, a hinge piece is fixedly disposed at the hinge position of the reinforcement rods, the two reinforcement rods of each of two sets of the stabilizer brackets are hinged to each other through the hinge piece, and the hinge piece has a keyhole arranged thereon. The reinforcement member locking device includes two sets of lock pins and a chassis lock. Each of two sets of lock pins is mounted on the bottom side of the middle protective chassis and penetrating through the keyhole of the stabilizer bracket to prevent the stabilizer bracket from folding inwards when the side-opening child car chassis is in the expanded state. The chassis lock is mounted on the bottom side of the middle protective chassis. One end of the chassis lock has a chassis lock sleeve configured to be sleeved around the hinge piece, and the chassis lock is configured to lock the stabilizer bracket on the bottom side of the middle protective chassis to prevent the middle protective chassis from being lifted upwards relative to the stabilizer bracket. One end of the unlock device is connected to the chassis lock, another end of the unlock device is configured to be operated by a user, so as to drive the chassis lock to be sleeved around the hinge piece to achieve locking, or to drive the chassis lock to be disengaged from the hinge piece to achieve unlocking.

Preferably, a first positioning piece and a second positioning piece are fixedly mounted on a bottom side of the hinge position that is corresponding to one side of the front chassis near the chassis lock and one side of the rear chassis near the chassis lock, the first positioning piece has a first positioning hole opened thereon, and the second positioning hole has a second positioning hole opened thereon. The chassis lock penetrates through the first positioning hole and is configured to move left and right along the first positioning piece, the chassis lock has a rotatable rod disposed on another end thereof, and a plurality of first inclined turning blocks are spaced apart with each other at an outer periphery of the rotatable rod. The unlock device includes a knob, a rotatable sleeved rod, a plurality of second inclined turning blocks, a spring limiting member, and a chassis lock spring. The knob is arranged on an outer side of the second positioning piece. The rotatable sleeved rod has one end fixedly connected to the knob and another end penetrating through the second positioning hole. The rotatable sleeved rod is rotatably sleeved around the movable rod and configured to rotate in the second position hole. The second inclined turning blocks are spaced apart with each other at an outer periphery of the rotatable sleeved rod. The plurality of second inclined turning blocks are configured to correspondingly abut against the first inclined turning blocks in a locked state, and be misaligned with the first inclined turning blocks in an unlock state. The spring limiting member is disposed on one of the first inclined turning blocks. The chassis lock spring is arranged between the spring limiting member and the first positioning piece. After rotating the knob, the second inclined turning blocks are correspondingly misaligned with the first inclined turning blocks, and the chassis lock moves outwards under resilience of the chassis lock spring, so that the chassis lock is disengaged from the hinge piece.

Preferably, each of the chassis lock sleeve and the first positioning hole has a cutting surface.

Preferably, a surface area of the knob is greater than a surface area of the second positioning hole, a limiting ring that faces an inner side of the second positioning piece is disposed on the rotatable sleeved rod, so as to prevent the knob from slipping off from the second positioning piece.

Adopting the above-mentioned technical features, the beneficial effects of the present disclosure are that: in the present disclosure, through the two sets of the stabilizer brackets disposed below the bottom portion of the main load-supporting chassis, the chassis can have enough strength, load-supporting ability, and excellent stability after expanded, and can also fit the requirements to allow children to get on and off the car at two sides by themselves. In addition, through the reinforcement member lock device and the unlock device, when the chassis is stored, the stabilizer brackets can be unlocked and stored, and after the chassis is expanded, the stabilizer brackets can be tightly locked and provide excellent stability.

In another aspect, the present disclosure provides a side-opening child car including a side-opening child car chassis, a chassis horizontal rod, a tie rod, four vertical rods, a fabric layer, and four wheels. The side-opening child car chassis is the side-opening child car chassis mentioned above. The chassis horizontal rod is horizontally mounted between the two car body connection assemblies respectively connected to the left end and the right end of the front chassis of the side-opening child car chassis. The tie rod is rotatably mounted on the chassis horizontal rod. The four vertical rods are respectively and vertically mounted on a top side of each of the car body connection assemblies. The fabric layer is surroundingly disposed among the four vertical rods and laid on a top side of the side-opening child car chassis. The four wheels are respectively disposed on a bottom side of each of the four car body connection assemblies.

Preferably, the side-opening child car further includes a foldable chair arranged in an accommodating chamber surrounded by the fabric layer and detachably mounted on a top side of the main load-supporting chassis and a foldable chair locking machine disposed between the foldable chair and the main load-supporting chassis. The foldable chair locking machine is configured to lock the foldable chair onto the main load-supporting chassis and configured to unlock the foldable chair.

Preferably, each of the four wheels has an axial through hole opened along an axis. The side-opening child car further includes a front car bracket, a rear car bracket, a hollow car axis, a telescopic assembly, a rotatable assembly, an elastic deceleration kit, a rope, a rope pulling assembly, and a rope returning spring. The front car bracket is correspondingly and vertically mounted on a top side of each of the two the car body connection assemblies respectively connected to the left end and the right end of the front chassis of the side-opening child car chassis. The rear car bracket is correspondingly and vertically mounted on a top side of each of the two car body connection assemblies respectively connected to the left end and the right end of the rear chassis of the side-opening child car chassis. The hollow car axis is rotatably mounted to two of the four wheels away from the tie rod through a bearing, and the hollow car axis has a first through slot arranged thereon. The telescopic assembly corresponds to the first through slot and is movably mounted on the hollow car axis. The rotatable assembly is mounted in the hollow car axis and configured to rotate around an axis of the hollow car axis, so as to push the telescopic assembly and the elastic deceleration kit to extend toward an inner wall of the axial through hole. The elastic deceleration kit sleeved around the telescopic assembly and configured to be in contact with or extruded with the inner wall of the axial through hole by being pushed by the telescopic assembly to provide deceleration. The rope having one end fixed and wound on the rotatable assembly and another end connected to the rope pulling assembly. The rope pulling assembly mounted on the rear car bracket and configured to pull the rope to unwind the rope to drive the rotatable assembly to rotate. The rope returning spring is mounted in the hollow car axis and on the rotatable assembly and configured to return the rotatable assembly and rope to original positions thereof.

Adopting the above-mentioned technical features, the beneficial effects of the present disclosure are that: in the present disclosure, adopting the child car having the side-opening child car chassis mentioned above, the child car have enough strength, load-supporting ability, and excellent stability after expanded, and can fully satisfy the requirements to get on and off the car from two sides by themselves.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
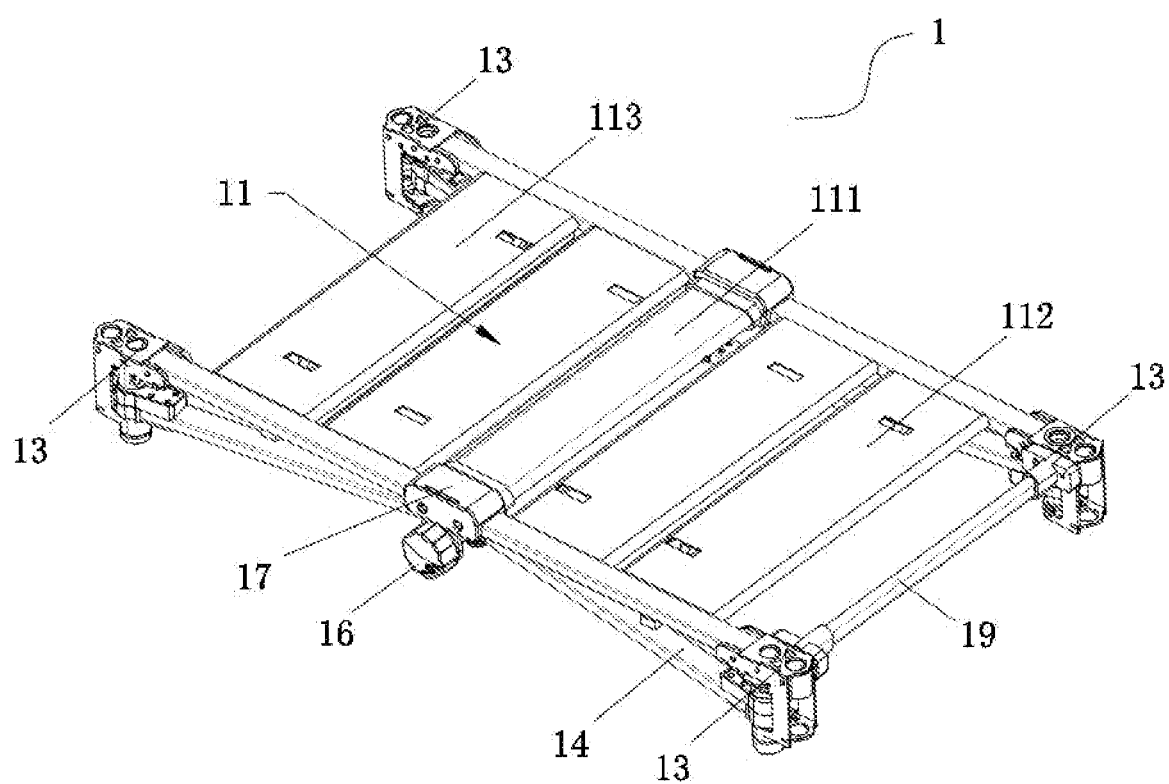
FIG. 1 is a structural schematic view of a child car chassis in an expanded state.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
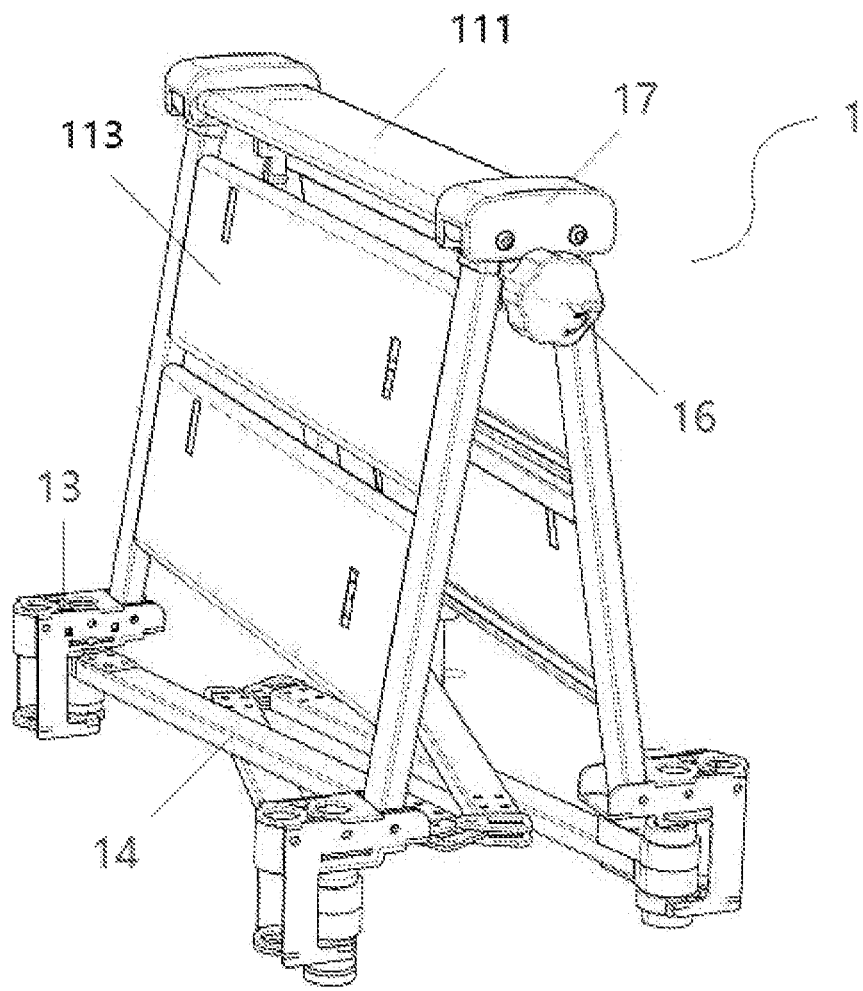
FIG. 2 is a structural schematic view of the child car chassis in a folded state.
Figure 3:
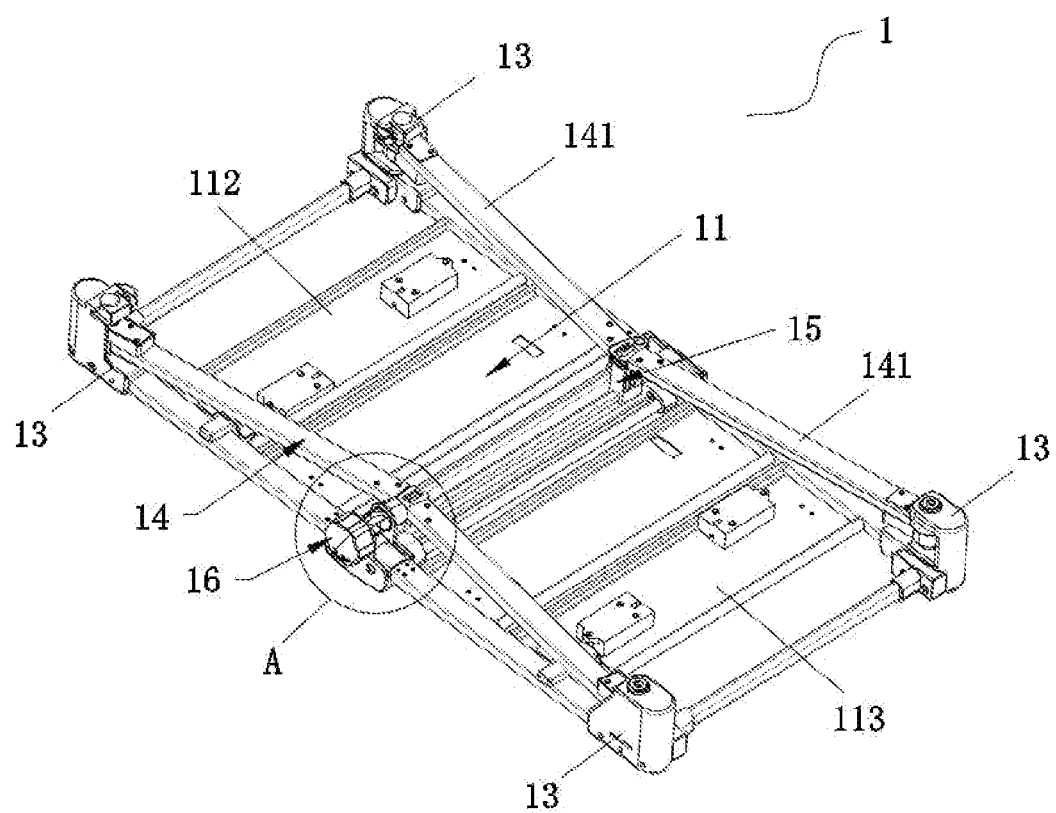
FIG. 3 is a structural schematic view from another angle of the child car chassis in the expanded state.

The present embodiment refers to a side-opening child car chassis 1, as shown in FIG. 1 to FIG. 3, including a main load-supporting chassis 11, a car body connection assembly 13, a stabilizer bracket 14, a reinforcement member locking device 15, and an unlock device 16.

The main load-supporting chassis 11 includes a middle protective chassis 111, a front chassis 112, and a rear chassis 113. The front chassis 112 and the rear chassis 113 are configured to vertically rotate around the middle protective chassis 111, and the front chassis 112, the rear chassis 113, and the middle protective chassis 111 are arranged at a same level after the front chassis 112 and the rear chassis 113 are expanded.

The quantity of the car body connection assembly 13 is four. Two of the car body connection assemblies 13 are rotatably connected to a left end and a right end of a front side of the front chassis 112, and another two of the car body assemblies 13 are rotatably connected to a left end and a right end of a rear side of the rear chassis 113. The front chassis 112 and the rear chassis 113 are configured to vertically rotate around corresponding car body connection assemblies 13.

As shown in FIG. 3, there are two sets of the stabilizer brackets 14, one set of the stabilizer brackets 14 is mounted on the left of a bottom portion of the main load-supporting chassis 11, another set of the stabilizer brackets 14 is mounted on the right of the bottom portion of the main load-supporting chassis 11, each set of stabilizer brackets 14 in an expanded state has a V shape, and a tip of each set of the stabilizer brackets 14 faces inwards. Each set of the stabilizer brackets 14 includes two reinforcement rods 141 hinged with each other, one end of one of the reinforcement rods 141 is rotatably connected to the car body connection assemblies 13 in the front, one end of another one of the reinforcement rods 141 is rotatably connected to the car body connection assemblies 13 at the rear, and the two reinforcement rods 141 are configured to horizontally rotate around corresponding car body connection assemblies 13.

Figure 4:
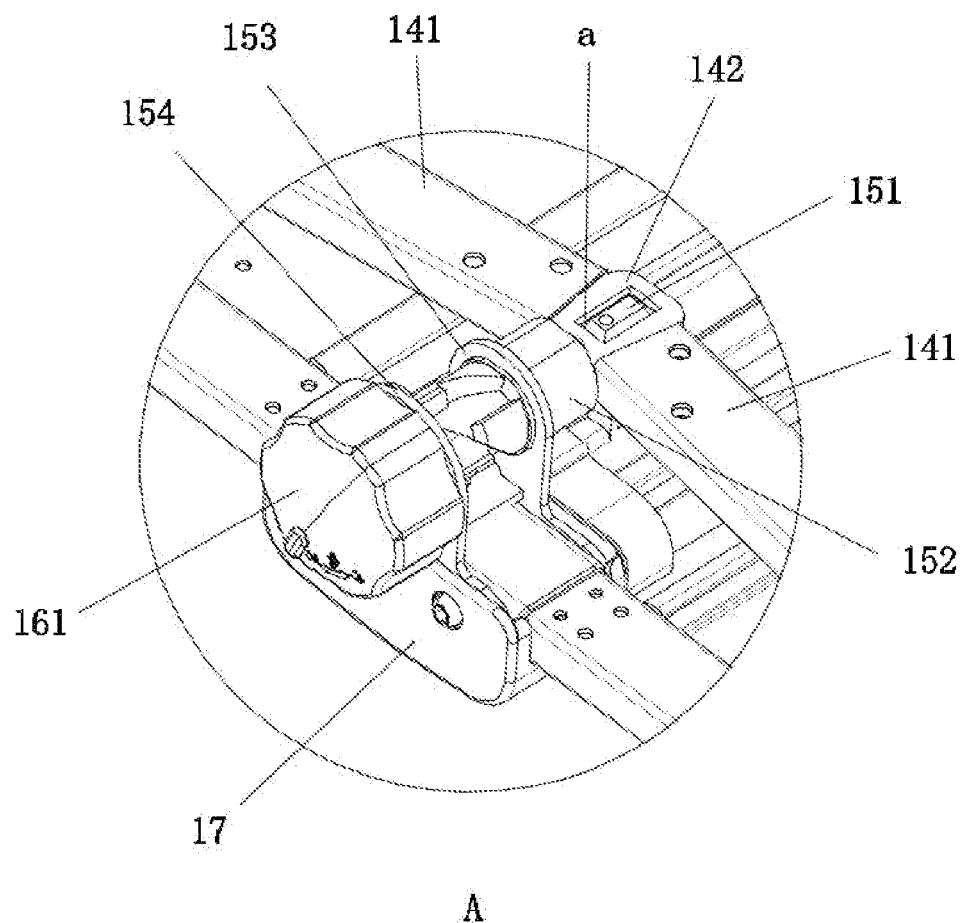
FIG. 4 is an enlarged view of region A in FIG. 3.

As shown in FIG. 3 and FIG. 4, a reinforcement member locking device 15 is disposed at a hinge position between the middle protective chassis 111 and the reinforcement rods 14 and is configured to lock the reinforcement rods 14 at a bottom side of the middle protective chassis 111. An unlocking device 16 is configured to control the reinforcement member locking device 15 to lock or to unlock.

Through the two sets of the reinforcement rods 14 disposed on the bottom side of the main load-supporting chassis 11, the side-opening child car chassis 1 can have enough strength and excellent loading capacity and stability after expanded, and can further satisfy requirements to allow children to get on and off the car from two sides by themselves. In addition, through the reinforcement member locking device 15 and the unlock device 16, when the side-opening child chassis 1 is stored, the stabilizer brackets 14 can be unlocked and stored, and when the side-opening child car chassis 1 is expanded, the stabilizer brackets 14 can be locked and provide excellent stability.

Since each set of stabilizer brackets 14 in an expanded state has the V shape, and the tip of each set of the stabilizer brackets 14 faces inwards, no matter the side-opening child car chassis 1 is stored or expanded, each set of stabilizer brackets 14 does not occupy additional space, a line connecting each set of stabilizer brackets 14 in the V shape and the main load-supporting chassis 11 is a triangle, so as to provide a stable structure.

Preferably, as shown in FIG. 2, the two sets of the stabilizer brackets 14 have a height difference to prevent the two sets of the stabilizer brackets 14 from interfering with each other when the side-opening child car chassis 1 is folded.

Preferably, as shown in FIG. 1, each of a left side and a right side of the middle protective chassis 111 has a limiting block 17 to correspondingly cover a rotating position of the front chassis 112 and the rear chassis 113, the limiting blocks 17 is sealed at the top and open at the bottom to prevent the front chassis 112 and the rear chassis 113 from rotating upwards relative to the middle protective chassis 11. Through the limiting block 17, the front chassis 112 and the rear chassis 113 can only rotate downwards relative to the middle protective chassis 111, thereby increasing a convenience and safety when the side-opening child chassis 1 is stored.

Figure 5:
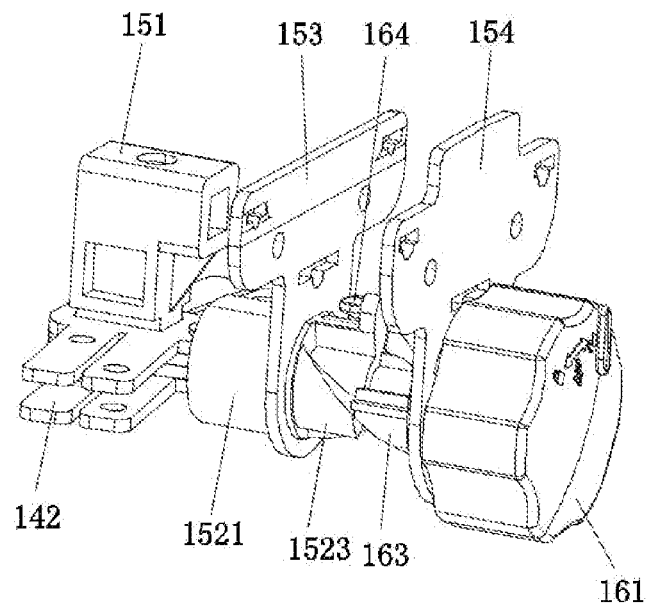
FIG. 5 is a structural schematic view of a reinforcement member lock device and a unlock device.

In the present embodiment, as shown in FIG. 3 to FIG. 5, a hinge piece 142 is fixedly disposed at the hinge position of the reinforcement rods 141, the two reinforcement rods 141 of each set of the stabilizer brackets 14 are hinged through the hinge piece 142. The hinge piece 142 has a keyhole opened thereon. More specifically, in the present embodiment, the hinge piece 142 on two reinforcement rods 141 of the same set of the stabilizer brackets 14 is hinged through an axis, so that the two reinforcement rods 141 are hinged. The reinforcement member locking device 15 includes two sets of lock pins 151 and a chassis lock 152. Specifically, as shown in FIG. 4 and FIG. 5, each of two sets of lock pins 151 is mounted on the bottom side of the middle protective chassis 111 and penetrate through the keyhole a of the stabilizer bracket 14 to prevent the stabilizer bracket 14 from folding inwards when the side-opening child car chassis 1 is in the expanded state. The chassis lock 152 is mounted on the bottom side of the middle protective chassis 111, and one end of the chassis lock 152 has a chassis lock sleeve 1521 configured to be sleeved around the hinge piece 142. The chassis lock 152 is configured to lock the stabilizer bracket 14 onto the bottom side of the middle protective chassis 111 to prevent the middle protective chassis 111 from being lifted upwards relative to the stabilizer bracket 14. One end of the unlock device 16 is connected to the chassis lock 152, another end is provided to be operated by a user, so as to drive the chassis lock 152 to be sleeved around the hinge piece 152 to achieve locking, or to drive the chassis lock 152 to be disengaged from the hinge piece 152 to achieve unlocking.

When stored, after the unlock device 16 drives the chassis lock 152 to be disengaged from the hinge piece 142, the hinge piece 142 is no longer retained by the chassis lock 152, in other words, the middle protective chassis 111 can be lifted relative to the stabilizer bracket 14, and after the middle protective chassis 111 is lifted relative to the stabilizer bracket 14, the lock pin 151 at the middle protective chassis 111 can be driven to be disengaged from the keyhole a, so that the stabilizer bracket 14 is stably unlocked. After unlocked, the middle protective chassis 111 is continuously lifted upwards, the front chassis 112 and the rear chassis 113 at the two sides rotate downwards and are folded, since a distance between the front chassis 112 and the rear chassis 113 is shortened, the stabilizer bracket 14 in the V shape is folded inwards and has a decreasing angle, and the storage is finished.

When expanded, the front chassis 112 and the rear chassis 113 are expanded towards the two sides, since the distance between the front chassis 112 and the rear chassis 113 is increased, the stabilizer bracket 14 in the V shape is expanded outwards, after the stabilizer bracket 14 in the V shape is fully expanded, the lock pin 151 falls off and penetrates through the keyhole a of the stabilizer bracket 14 to prevent the stabilizer bracket from folded inwards, and the chassis lock 152 is driven by the unlock device 16 to be sleeved around the hinge piece 142 to achieve locking.

Figure 6:
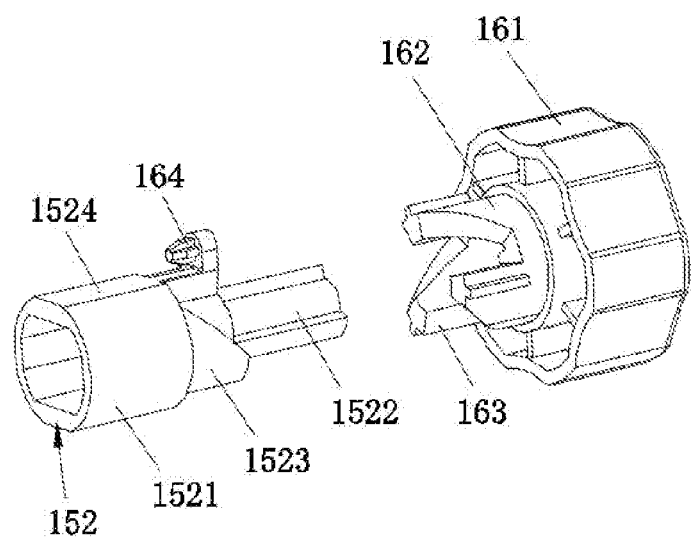
FIG. 6 is a structural schematic view of the child car in the expanded state.

On this basis, as shown in FIG. 4 to FIG. 6, a first positioning piece 153 and a second positioning piece 154 are fixedly mounted on a bottom side of the hinge position of one side of the front chassis 112 and the rear chassis 113 near the chassis lock 152, the first positioning piece 153 has a first positioning hole (not shown) opened thereon, and the second positioning hole 154 has a second positioning hole (not shown) opened thereon. The chassis lock 152 penetrates through the first positioning hole and is configured to move left and right along the first positioning piece 153. The chassis lock 152 has a rotatable rod 1522 disposed on another end thereof, and a plurality of first inclined turning blocks 1523 are spaced apart with each other at an outer periphery of the rotatable rod 1522. As shown in the figures. the unlock device 16 includes a knob 161, a rotatable sleeved rod 162, a plurality of second inclined turning blocks 163, a spring limiting member 164, and a chassis lock spring (not shown). The knob 161 is arranged outside of the second positioning piece 154. The rotatable sleeved rod 162 has one end fixedly connected to the knob 161 and another end penetrating through the second positioning hole. The rotatable sleeved rod 162 is rotatably sleeved around the movable rod 1522 and is configured to rotate in the second positioning hole. The second inclined turning blocks 163 are spaced apart with each other, disposed around the outer periphery of the rotatable sleeved rod 162, configured to abut against the first inclined turning blocks 1523 in a locked state, and be misaligned with the first inclined turning blocks 1523 in an unlock state. The spring limiting member 164 is disposed on one of the first inclined turning blocks 1523. The chassis lock spring is arranged between the spring limiting member 164 and the first positioning piece 153. When in the lock state, the chassis lock spring is in a pressed state.

When unlocked, the knob 161 is turned, and the second inclined turning blocks 163 are misaligned with the first inclined turning blocks 1523. The chassis lock 152 moves outwards under the function of resilience of the chassis lock spring, so that the chassis lock 152 is disengaged from the hinge piece 142. When finishing unlocking, the knob 161 is reversely turned, the second inclined turning blocks 163 rotate to drive the first inclined turning blocks 1523 to move inwards, thereby pushing the chassis lock 152 to be sleeved around the hinge piece 142, and after unlocking, the chassis lock spring is again in the pressed state.

Further, as shown in FIG. 6, both the chassis lock sleeve 1521 and the first position hole have a cutting surface 1524. This configuration allows the chassis lock sleeve 1521 to not rotate in the first positioning hole, and it is more favorable for locking and unlocking of the chassis lock 152.

Further, a surface area of the knob 161 is greater than a surface area the second positioning hole. The rotatable sleeved rod 162 has a limiting ring (not shown) disposed thereon inside of the second positioning piece 154, so as to prevent the knob 161 from slipping off from the second positioning piece 154.

Second Embodiment

Figure 7:
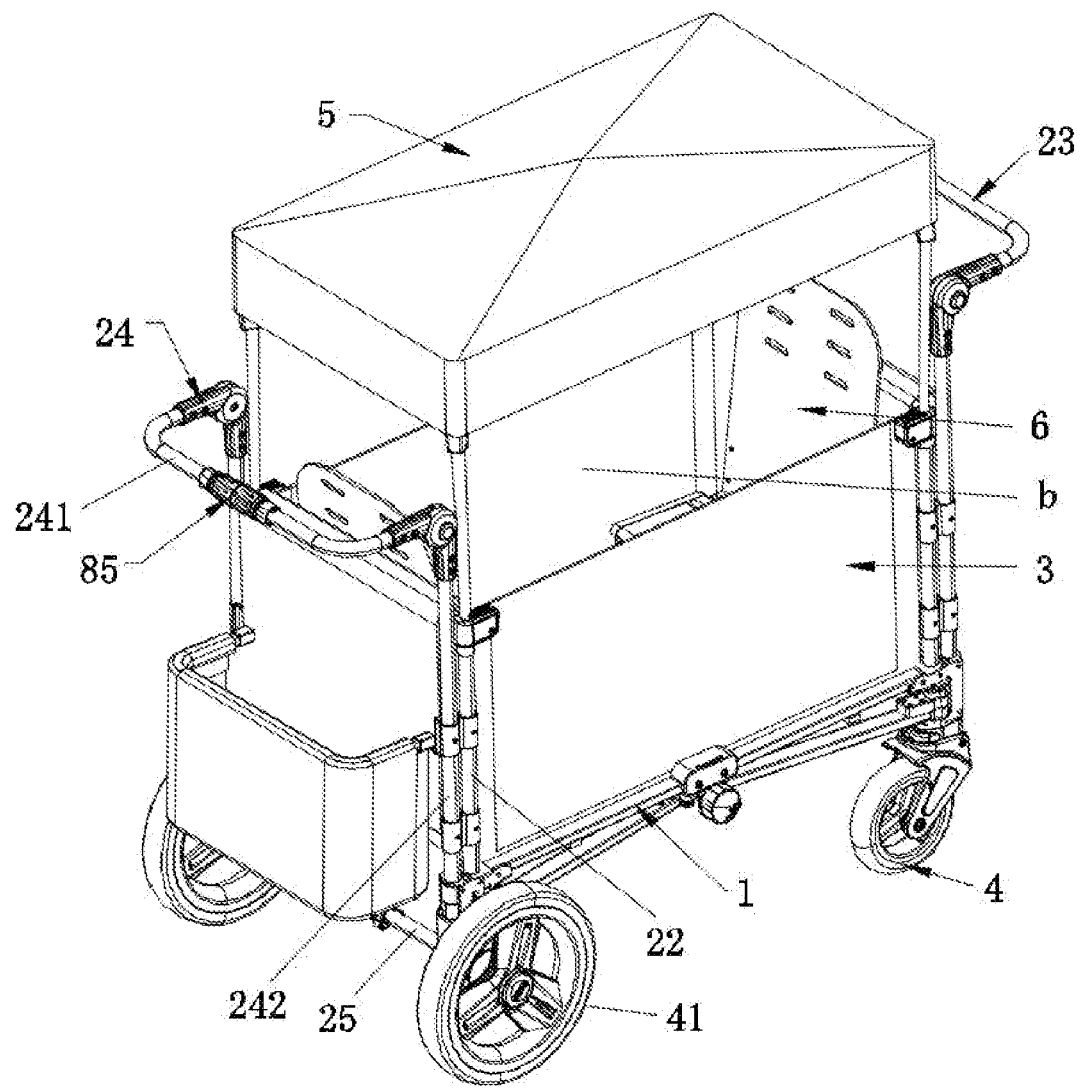
FIG. 7 is a structural schematic view of the child car in the expanded state.
Figure 8:
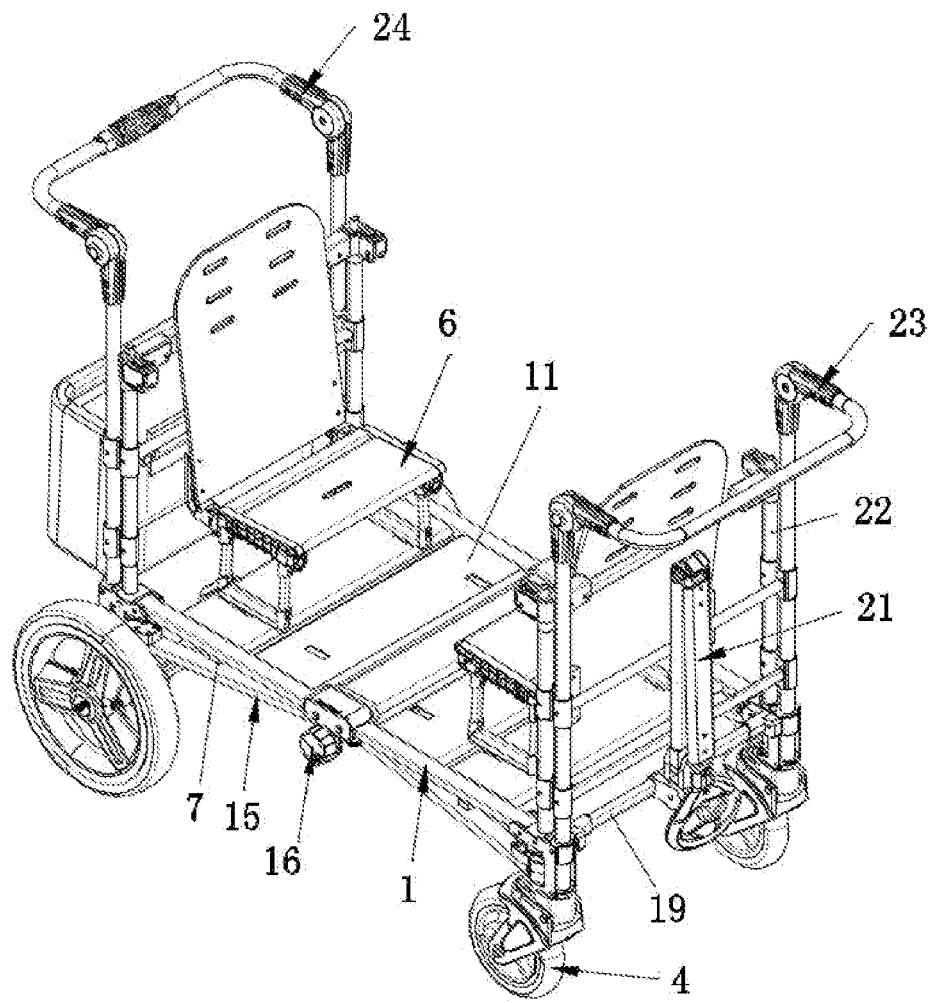
FIG. 8 is a structural schematic view of the child car in the expanded state omitting a fabric layer and a ceiling.
Figure 9:
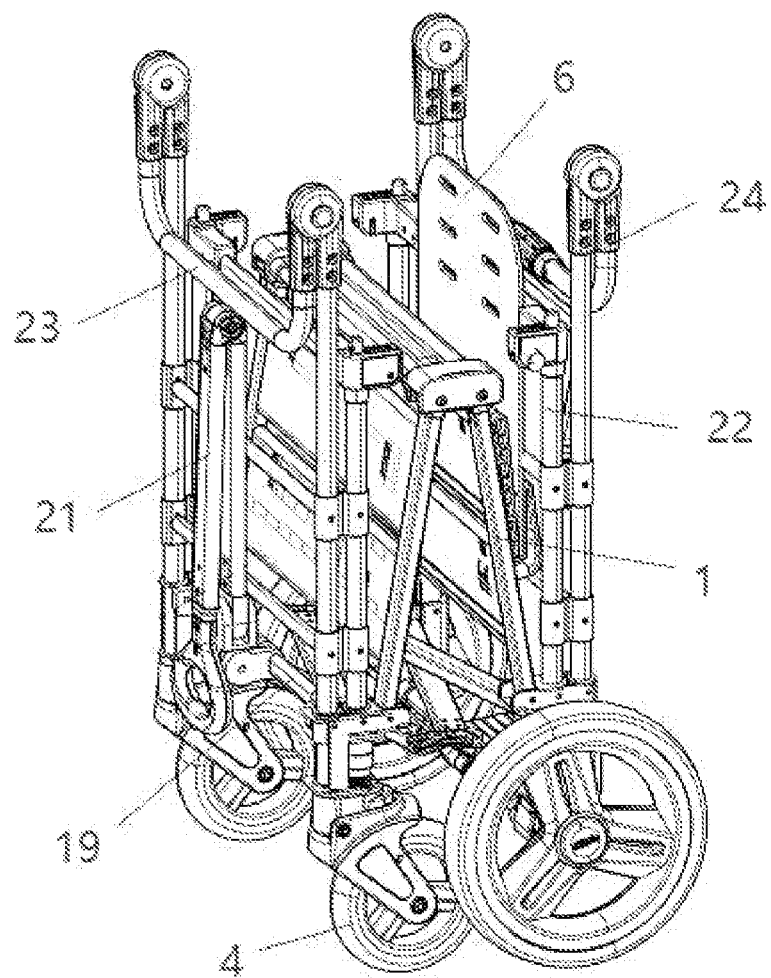
FIG. 9 is a structural schematic view of the child car in the folded state.

The present embodiment refers to a side-opening child car, as shown in FIG. 7 to FIG. 9, including a side-opening child car chassis 1, a chassis horizontal rod 19, a tie rod 21, four vertical rods 22, a fabric layer 3, four wheels 4, and a ceiling 5.

The side-opening child car chassis 1 is the side-opening child car chassis 1 mentioned in the first embodiment. The chassis horizontal rod 19 is horizontally mounted between two of the car body connection assemblies 13 at the left and at the right of the front chassis 112 of the side-opening child car chassis 1. The tie rod 21 is rotatably mounted on the chassis horizontal rod 19. The four vertical rods 22 are vertically mounted on a top side of the car body connection assemblies 13. The fabric layer 3 is surroundingly disposed among the four vertical rods 4 and laid on a top side of the side-opening child car chassis 1. The four wheels 4 are disposed on a bottom side of the car body connection assemblies 13. The ceiling 5 is detachably mounted on a top side of the four vertical rods 22.

When folded and stored, the ceiling 5 is previously taken out, since the fabric layer 3 is made of a soft material, the fabric layer 3 is not required to be taken out, and folding and storing can be performed. In the present embodiment, the tie rod 21 is a foldable tie rod 21.

Third Embodiment

The present embodiment refers to a side-opening child car, based on the second embodiment, as shown in FIG. 7 to FIG. 10, the side-opening child car further includes a foldable chair 6 and a foldable chair lock machine 7. The foldable chair 6 is arranged inside of the accommodating chamber b surrounded by the fabric layer 3 and detachably mounted on the top side of the main load-supporting chassis 11. The foldable chair lock machine 7 is disposed between the foldable chair 6 and the main load-supporting chassis 11, configured to lock the foldable chair 6 onto the main load-supporting chassis 11, and configured to unlock it.

With the use of the foldable chair 6, after the foldable chair 6 is folded, less space of the accommodating chamber b is occupied, and therefore, there is more space in the accommodating chamber b that can be arranged at will. In addition, after the foldable chair 6 is folded, the foldable chair 6 does not affect the folding of the side-opening child car chassis 1. Further, since the foldable chair lock machine 7 is disposed between the foldable chair 6 and the main load-supporting chassis 11, the foldable chair 6 can be fixed on the main load-supporting chassis 11 and can be stably mounted with high safety. In addition, since the foldable chair 6 is detachably mounted on the main load-supporting chassis 11, the foldable chair lock machine 7 can unlock the foldable chair 6, and after the foldable chair 6 is detached, the space in the accommodating chamber b is enlarged, the side-opening child car can be used as a shopping car or a camp car, and the accommodating chamber b can be expanded to be a parent-child game platform. In addition, the foldable chair 6 can be detached, and cleaning is more convenient.

Figure 10:
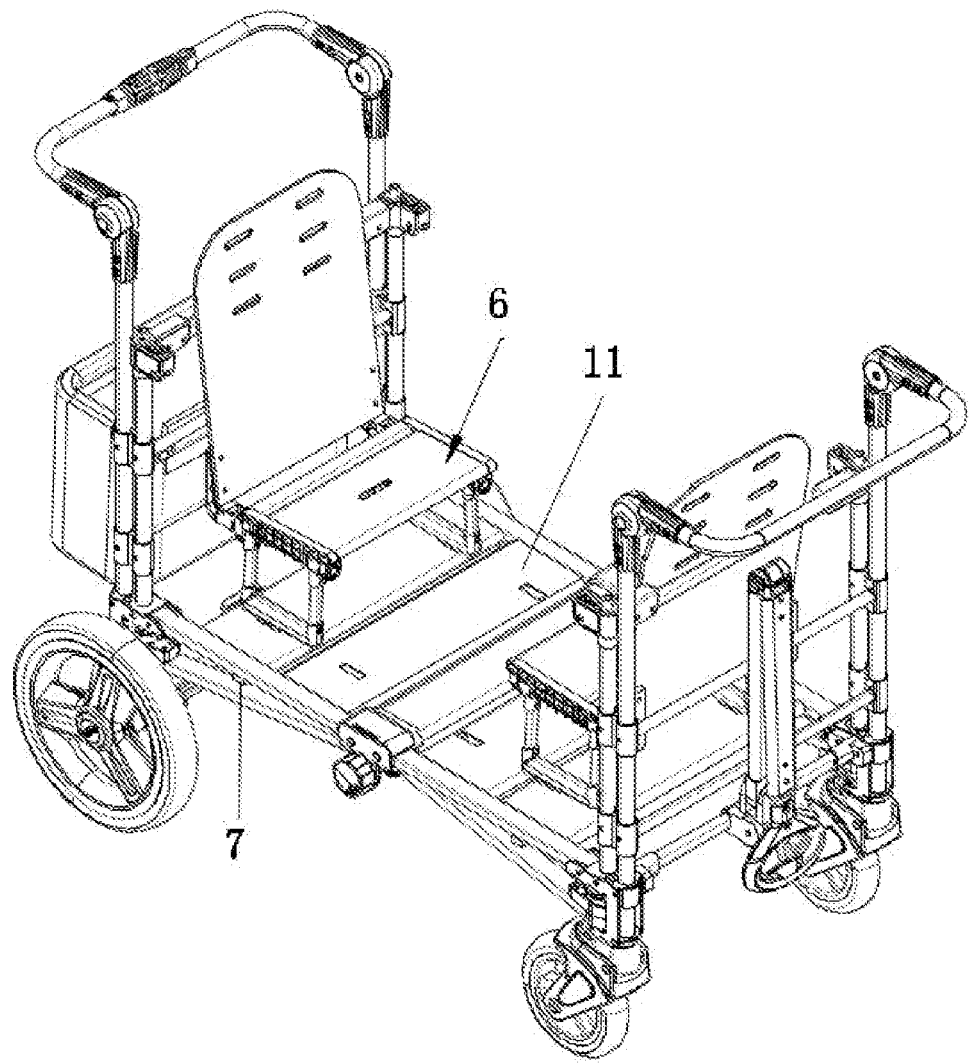
FIG. 10 is a structural schematic view of a foldable chair mounted on the child car.
Figure 11:
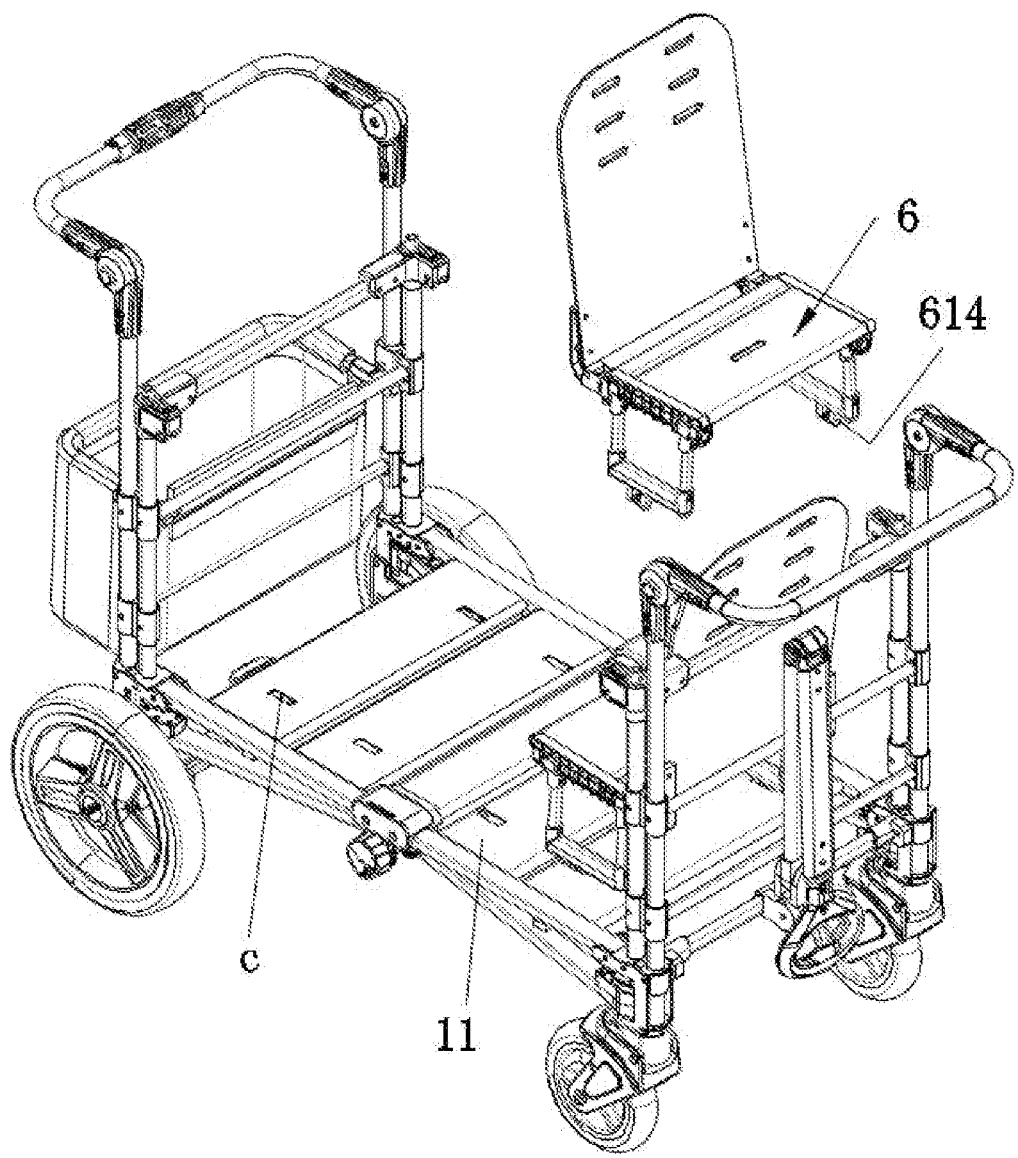
FIG. 11 is a structural schematic view of the foldable chair and the child car.
Figure 12:
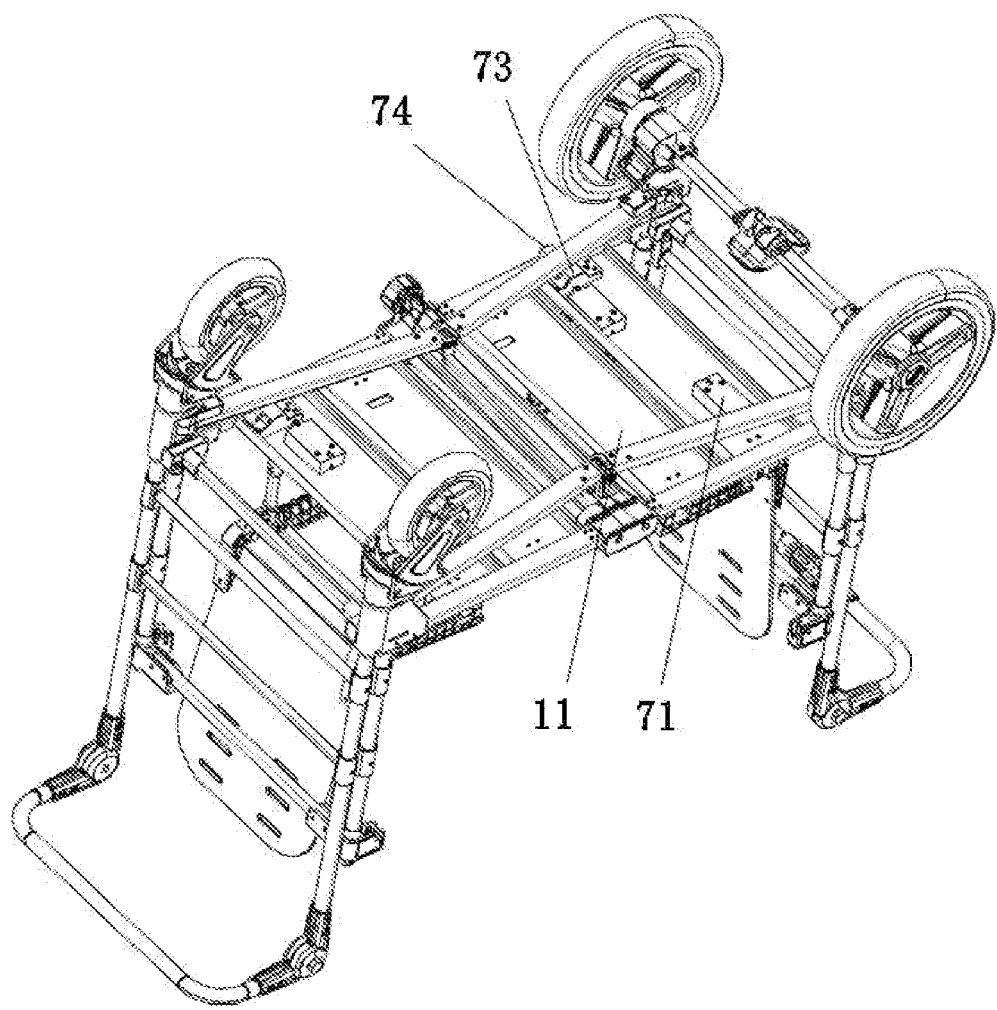
FIG. 12 is a structural schematic view from another angle of the child car in the expanded state.
Figure 13:
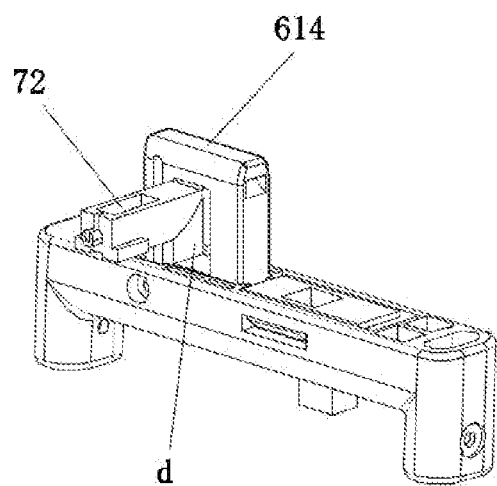
FIG. 13 is a structural schematic view of a deadbolt and a plug.
Figure 14:
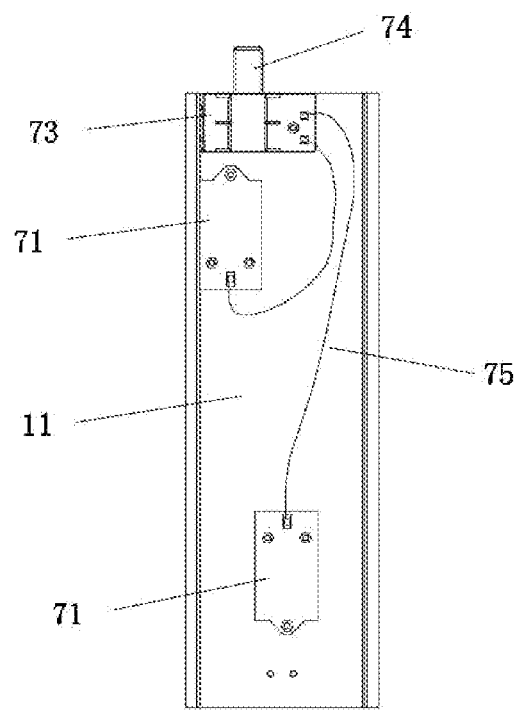
FIG. 14 is a wiring schematic view of a brake cable.

In the present embodiment, as shown in FIG. 10 to FIG. 12, the main load-supporting chassis 11 has a first insert hole c opened thereon, and the foldable chair 6 has a plug 614 at a bottom side thereof, and the plug 614 is compatible with the first insert hole c and can be detachably inserted into the first insert hole c. In other embodiments, the foldable chair 6 can be detachably mounted on the main load-supporting chassis 11 with other configuration.

Preferably, the foldable chair 6 has a cavity is disposed on a top side of the plug 614. The plug 614 can be retracted into the cavity, so that the bottom side of the foldable chair 6 is even. After the foldable chair 6 is detached from the main load-supporting chassis 11, since the plug 614 can be retracted into the cavity, the foldable chair 6 can be independently used without being affected.

As shown in FIG. 10, FIG. 12, FIG. 13, and FIG. 14, in the present embodiment, the foldable chair lock machine 7 includes a through hole d opened on the plug 614 along a horizontal direction, a seat lock mounting box 71 mounted on the bottom side of the main load-supporting chassis 11, a deadbolt 72 slidably mounted in the seat lock mounting box 71 and configured to penetrate through or return from the through hole d, an unlock button mounting box 73 mounted on the bottom side of the main load-supporting chassis 11, an unlocking button 74 having one end mounted in the unlock button mounting box 73 and another end extending out of the unlock button mounting box 73 to be pressed by a user, and a brake cable 75 having one end penetrating through the seat lock mounting box 71 and connected to the deadbolt 72 and another end penetrating through the unlock button mounting box 73 and connected to the unlock button 74. When the user presses the unlock button 74, the brake cable 75 drives the deadbolt 72 to return from the through hole d, and therefore, the foldable chair 6 can be taken out.

The above description is merely one specific embodiment of the foldable chair lock machine 7, in other embodiments, the foldable chair lock machine 7 can adapt other configurations, as long as the foldable chair 6 can be locked on the main load-supporting chassis 11 and can be unlocked.

In the present embodiment, the foldable chair 6 is a linkage foldable chair 6, and folding is simpler and more convenient.

In the present embodiment, as shown in FIG. 15 to FIG. 20, the linkage foldable chair 6 includes a backrest 601, a first bracket 602a, a second bracket 602b, a first connecting rod 603a, a second connecting rod 603b, a first rotating fixing member 604a, a second rotating fixing member 605a, a third rotating fixing member 604b, a fourth rotating fixing member 605b, a seat 606, a first outrigger rotating member 607a, a second outrigger rotating member 608a, a third outrigger rotating member 607b, a fourth outrigger rotating member 608b, a first outrigger 609a, a second outrigger 610a, a third outrigger 609b, a fourth outrigger 610b, a first crossbeam 611a, a second crossbeam 611b, a first spring 712a, and a second spring (not shown).

Figure 15:
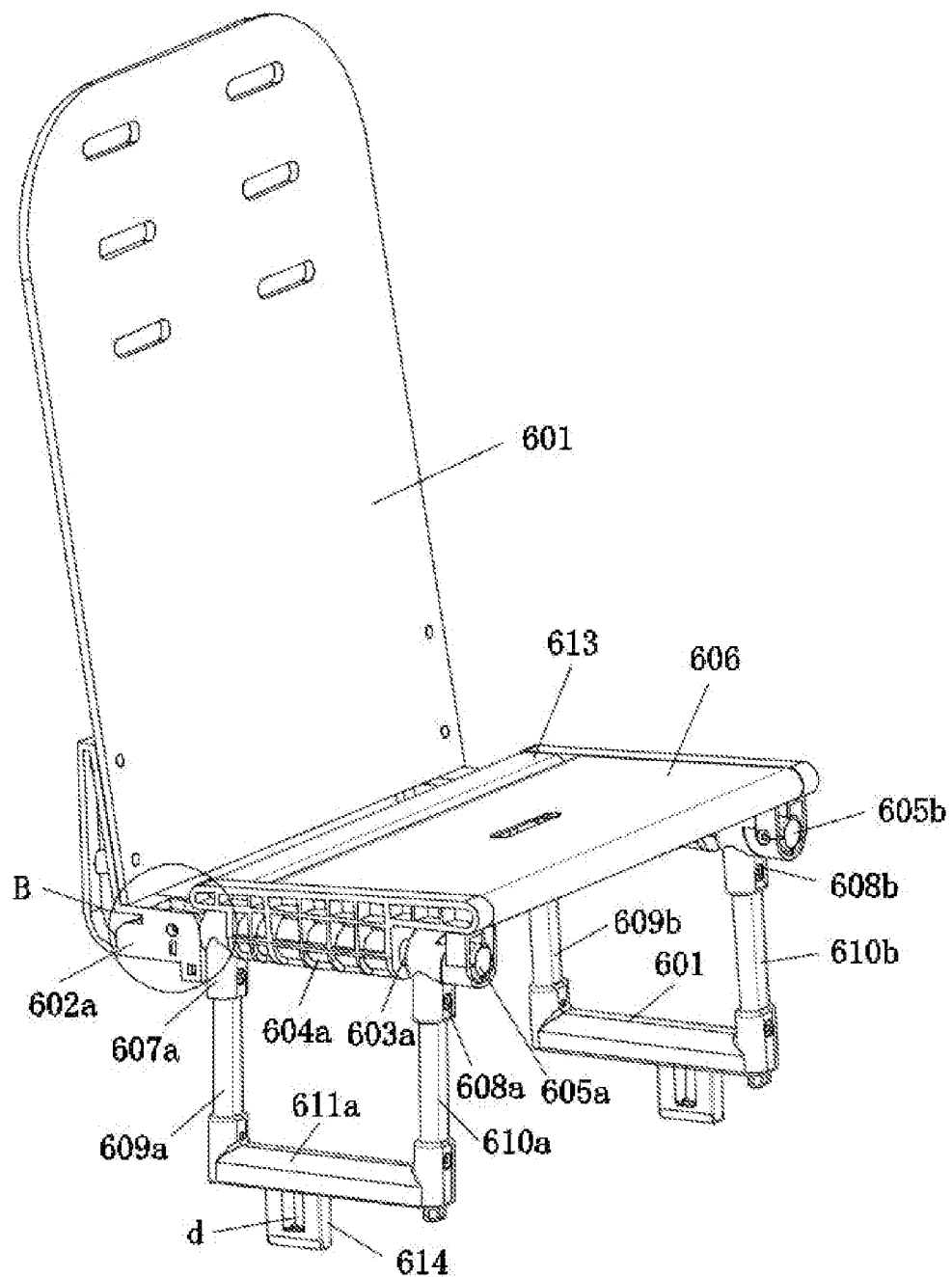
FIG. 15 is a structural schematic view of the foldable chair in the expanded state.
Figure 16:
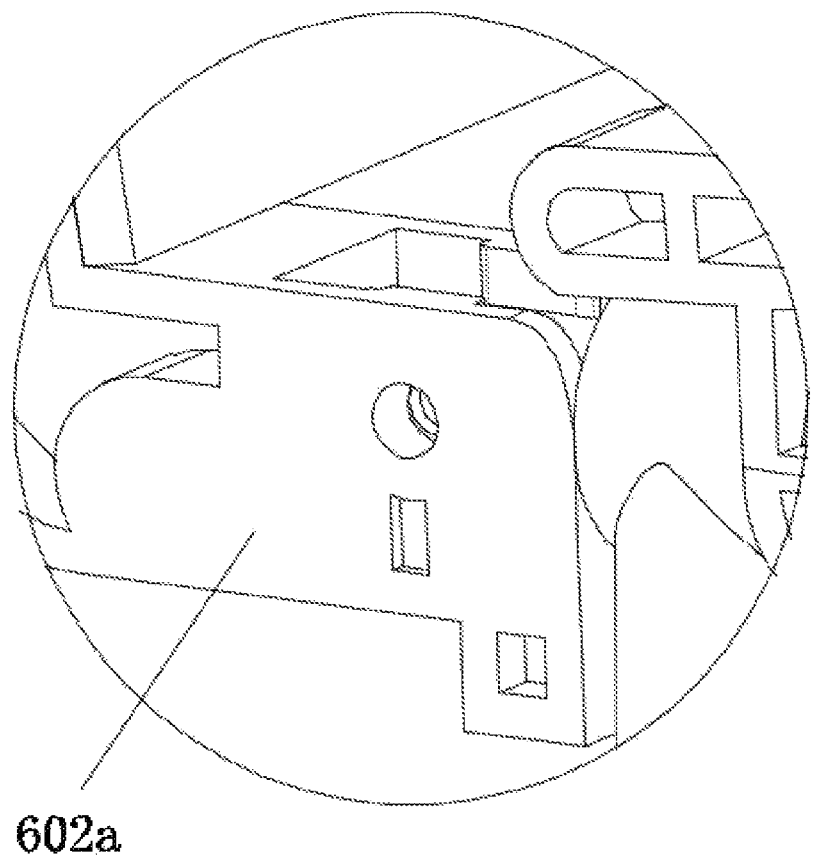
FIG. 16 is an enlarged view of region B in FIG. 15.
Figure 17:
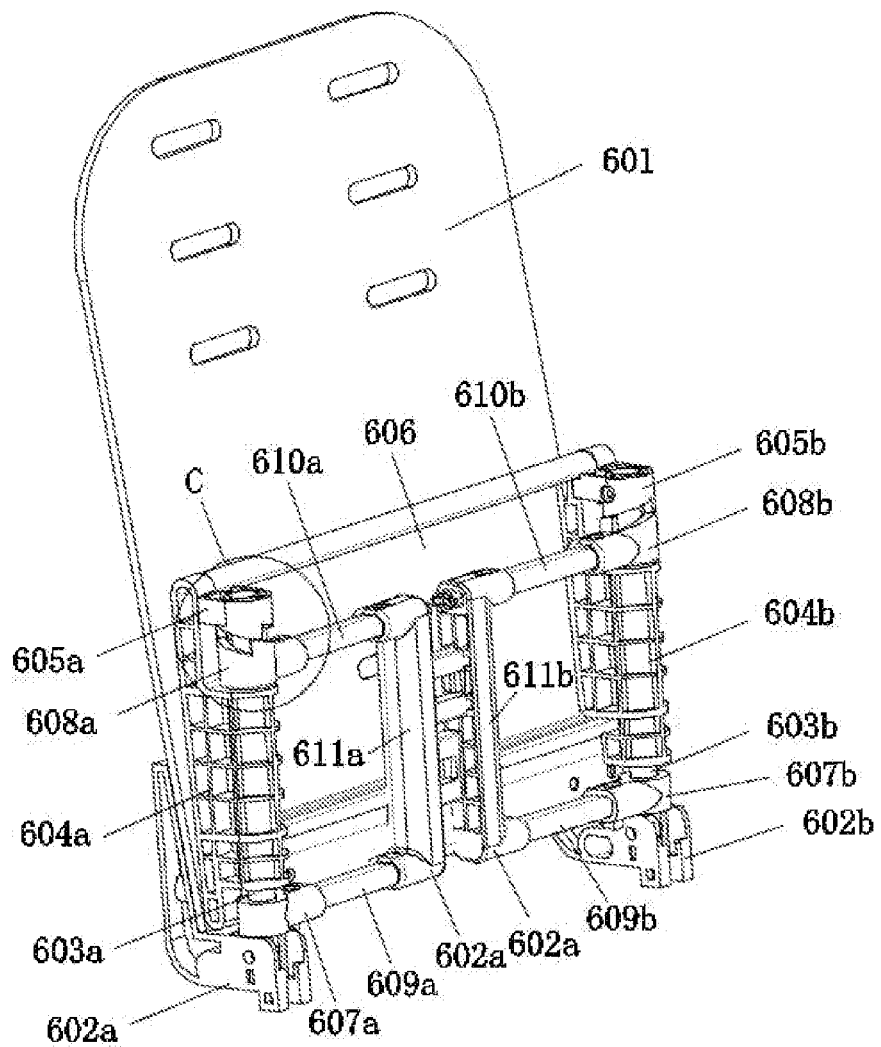
FIG. 17 is a structural schematic view of the foldable chair in a folded state.
Figure 20:
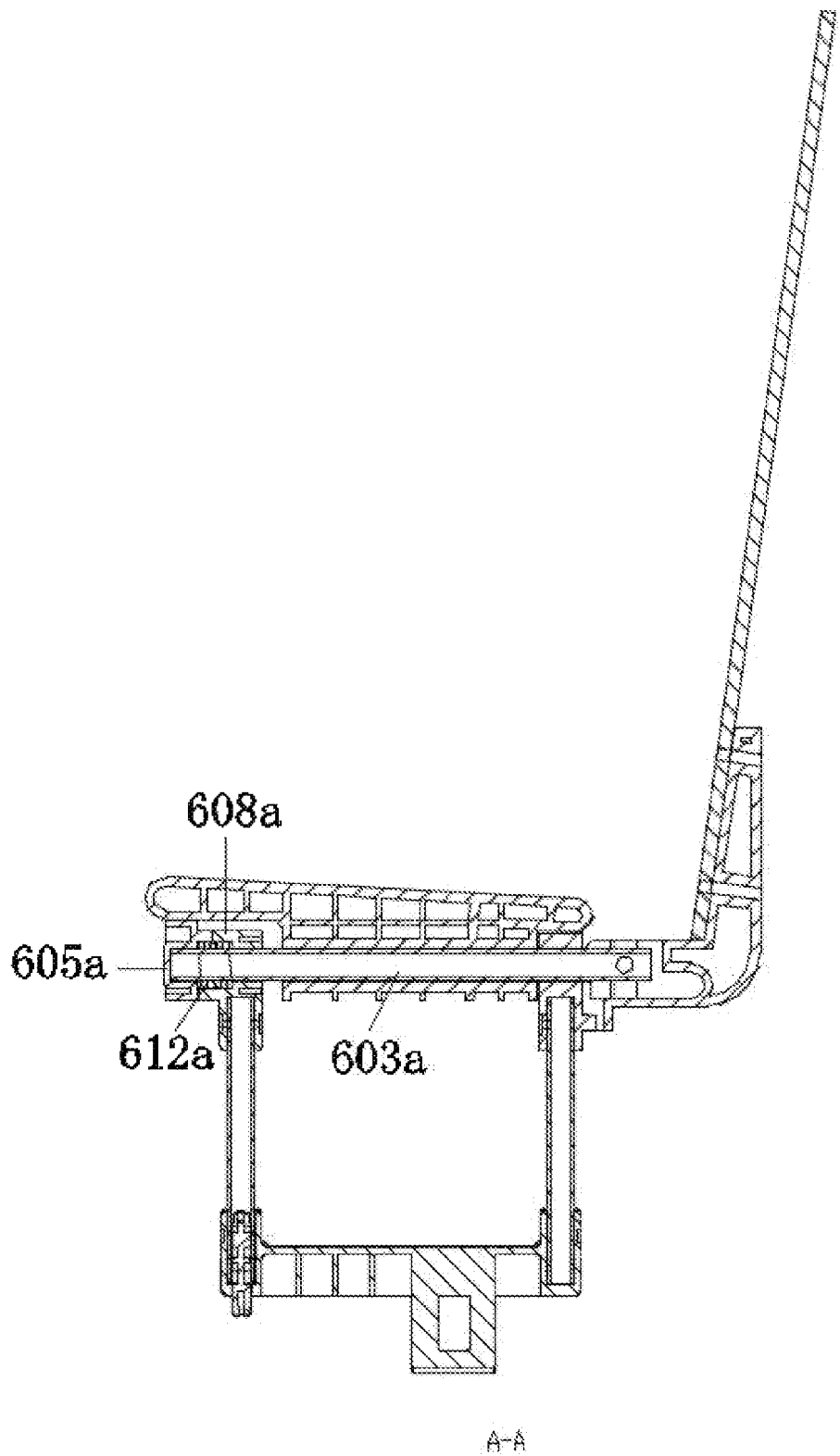
FIG. 20 is a section view of portion A-A in FIG. 19.

Specifically, as shown in FIG. 15 to FIG. 17, the first bracket 602a is fixedly mounted at one end of a bottom side of the backrest 601 and extends toward a front side of the backrest 601. The second bracket 602b is fixedly mounted at another end of the bottom side of the backrest 601 and extends toward the front side of the backrest 601. One end of the first connecting rod 603a is rotatably mounted at an extending end of the first bracket 602a through a first rotatable shaft (not shown). One end of the second connecting rod 603b is rotatably mounted at an extending end of the second bracket 602b through a second rotatable shaft (not shown). The first rotating fixing member 604a is fixedly sleeved around the first connecting rod 603. The third rotating fixing member 604b is fixedly sleeved around the second connecting rod 603*b*. The seat 606 is fixedly mounted between the first rotating fixing member 604*a* and the third rotating fixing member 604*b* and configured to rotate around the backrest 601. The second rotating fixing member 605*a* is fixedly sleeved around an end of the first connecting rod 603*a* away from the backrest 601. The fourth rotating fixing member 605*b* is fixedly sleeved around an end of the second connecting rod 603*b* away from the backrest 601. The first outrigger rotating member 607*a* is rotatably sleeved around the first connecting rod 603*a* and arranged between the first rotating fixing member 604*a* and the first bracket 602*a*. The third outrigger rotating member 607*b* is rotatably sleeved around the second connecting rod 603*b* and arranged between the third rotating fixing member 604*b* and the second bracket 602*b*. The second outrigger rotating member 608*a* is rotatably sleeved around the first connecting rod 603*a* and arranged between the first rotating fixing member 604*a* and the second rotating fixing member 605*a*. The fourth outrigger rotating member 608*b* is rotatably sleeved around the second connecting rod 603*b* and arranged between the third rotating fixing member 604*b* and the fourth rotating fixing member 605*b*. The first outrigger 609*a* is disposed at a bottom side of the first outrigger rotating member 607*a*. The second outrigger 610*a* is disposed at a bottom side of the second outrigger rotating member 608*a*. The third outrigger 609*b* is disposed at a bottom of the third outrigger rotating member 607*b*. The fourth outrigger 610*b* is disposed at a bottom portion of the fourth outrigger rotating member 608*b*. The first crossbeam 611*a* is fixedly connected between the first outrigger 609*a* and the second outrigger 610*a*. The second crossbeam 611*b* is fixedly connected between the third outrigger 609*b* and the fourth outrigger 610*b*. As shown in FIG. 20, the first spring 712*a* is sleeved around the first connecting rod 603*a* and has one end abutted against the second outrigger rotating member 608*a* and another end abutted against the second rotating fixing member 605. The second spring (not shown) is sleeved around the second connecting rod 603*b* and has one end abutted against the third outrigger rotating member 607*b* and another end abutted against the fourth rotating fixing member 605*b*.

Figure 18:
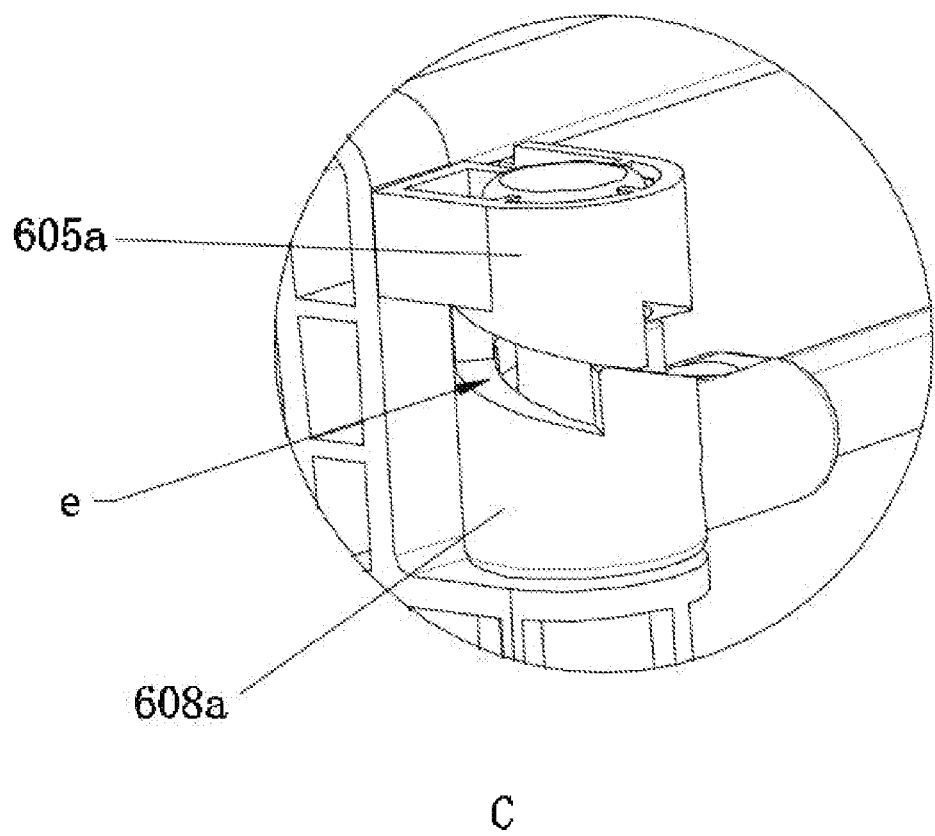
FIG. 18 is an enlarged view of region C in FIG. 17.
Figure 19:
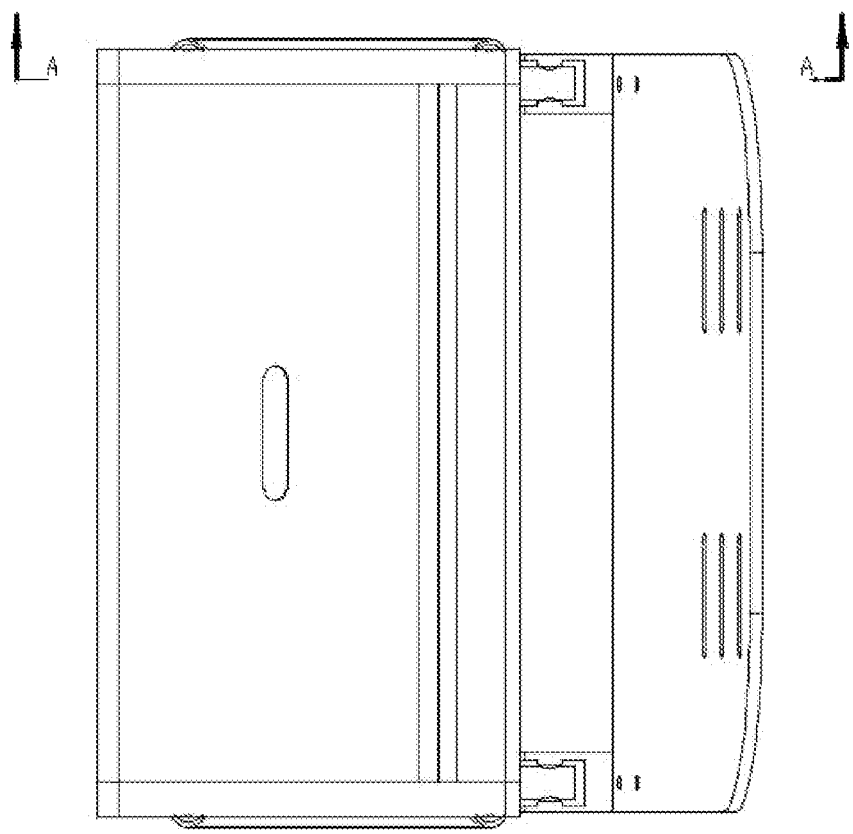
FIG. 19 is a top view of the foldable chair.

More specifically, as shown in FIG. 18, the structure between the second outrigger rotating member 608*a* and the second rotating fixing member 605*a* and between the fourth outrigger rotating member 608*b* and the fourth rotating fixing member 605*b* is a pressing structure e (the pressing structure e can be referred to a structure of a ballpoint pen). As shown in the figure, a distance between the first rotatable shaft (referring to a circular hole in FIG. 8) and a front end of the first bracket 602*a* is greater than a distance between the first rotatable shaft and a top end of the first bracket 602*a*. Similarly, a distance between the second rotatable shaft and a front end of the second bracket 602*b* is greater than a distance between the second rotatable shaft and a top end of the second bracket 602*b*.

When the linkage foldable chair 6 is in the expanded state, as shown in FIG. 15 and FIG. 20, one end of the first outrigger rotating member 60*a* is abutted against the first bracket 602*a*, another end is abutted against the first rotating fixing member 604*a*, one end of the second outrigger rotating member 608*a* is abutted against the second rotating fixing member 605*a*, a travel space is maintained between another end and the first rotating fixing member 604*a*, and the first spring 712*a* is in a pressed state. At the same time, one end of the third outrigger rotating member 607*b* is abutted against the second bracket 602*b*, another end is abutted against the third rotating fixing member 604*b*, one end of the third outrigger rotating member 607*b* is abutted against the fourth rotating fixing member 605*b*, a travel space is maintained between another end and the third rotating fixing member 604*b*, and the second spring is in a pressed state.

As shown in FIG. 17, the seat 606 rotates upwards, since the distance between the first rotatable shaft and the front end of the first bracket 602*a* is greater than the distance between the first rotatable shaft and the top end of the first bracket 602*a*, the travel space is maintained between the first outrigger rotating member 607*a* and the first bracket 602, under the function of resilience of the first spring 712*a*, the second outrigger rotating member 608*a* moves toward the second rotating fixing member 605*a*, and under the function of the pressing structure e, the second outrigger 610*a* and the first outrigger 609*a* rotate and are folded toward a middle of a bottom side of the seat 606. Similarly, the travel space is maintained between the third outrigger rotating member 607*b* and the second bracket 602*b*, under the function of resilience of the second spring, the fourth outrigger rotating member 608*b* moves toward the fourth rotating fixing member 605*b*, and under the function of the pressing structure e, the fourth outrigger 610*b* and the third outrigger 609*b* rotate and are folded toward the middle of the bottom side of the seat 606.

When the linkage foldable chair 6 of the present embodiment is adapted and during folding, the foldable chair 6 is only required to rotate toward the backrest 601, the four outriggers are driven to return and finally folded and stored at the bottom side of the seat 606, which is much convenient.

Figure 22:
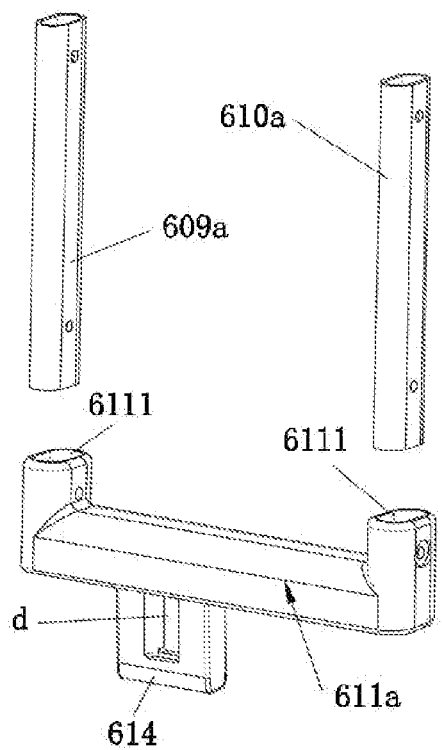
FIG. 22 is a structural schematic view of a first crossbeam, a first outrigger, and a second outrigger.

Further, as shown in FIG. 22, each of two ends of the first crossbeam 611*a* has a first sleeve 6111 disposed thereon, and the first crossbeam 611*a* is sleeved around a bottom side of the first outrigger 609*a* and the second outrigger 610*a* through the two first sleeves 6111. Each of two ends of the second crossbeam 611*b* has a second sleeve (not shown), and the second crossbeam 611*b* is sleeved around a bottom side of the third outrigger 609*b* and the fourth outrigger 610*b* through the two second sleeves. This configuration is equal to combining the first outrigger 609*a* and the second outrigger 610*a* into one outrigger, combining the third outrigger 609*b* and the fourth outrigger 610*b* into one outrigger, and the outriggers are supported by the first crossbeam 611*a* and the second crossbeam 611*b*.

Further, as shown in FIG. 17, a length of the outrigger is less than or equal to a half of a length of the seat 606, so that after the linkage foldable chair 6 is folded, the outriggers do not interfere with each other.

As shown in FIG. 15, in the present embodiment, the quantity of the plug 614 is two, one of the plugs 614 is disposed at a bottom side of the first crossbeam 611*a*, and another one of the plugs 614 is disposed at a bottom side of the second crossbeam 611*b*. In order to allow the outriggers to be as long as possible without interference, as shown in FIG. 17, the two plugs 614 stagger with each other.

In the present embodiment, except the structure of the plugs 614, the overall linkage foldable chair 6 is disposed in lateral symmetry.

The first bracket 602*a* and the second bracket 602*b* are both in a shape of the letter "L" and have an angle within a range from 90 degrees to 110 degrees, and therefore, an angle between the seat 606 and the backrest 601 is also within a range from 90 degrees to 110 degrees. In the present embodiment, the angle between the seat 606 and the backrest 601 is 95 degrees.

Figure 21:
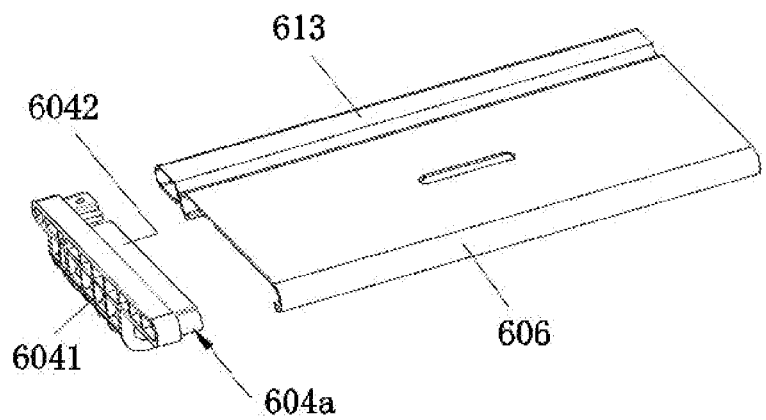
FIG. 21 is a structural schematic view of a seat, a seat horizontal tube, and a first rotating fixing member.

In the present embodiment, as shown in FIG. 21, the first rotating fixing member 604*a* includes a first long barrel 6041 fixedly sleeved around the first connecting rod 603a and a first mounting strip 6042 disposed on a top side of the first long barrel 6041 and provided to be mounted with the seat 606. The third rotating fixing member 604b includes a second long barrel (not shown) fixedly sleeved around the first connecting rod 603a and a second mounting strip (not shown) disposed on a top side of the second long barrel and provided to be mounted with the seat 606. As shown in FIG. 15 and FIG. 21, the linkage foldable chair 6 further includes a seat horizontal tube 613 arranged at one side of the seat 606 near the backrest 601 and having one end mounted on the first mounting strip 6042 and another end mounted on the second mounting strip.

Preferably, there are two rows of the foldable chairs 6 arranged in an opposite direction, and there is a space between the two rows of the foldable chairs 6 that allows children to place their legs. In the present embodiment, as shown in the figures, there is one foldable chair 6 in each row. When more seats are required, besides widening the side-opening child car chassis 1, a length of the seat 606 can be increased, or more foldable chairs 6 can be disposed.

The work principle of the present embodiment is substantially described as follows. The foldable chair 6 is adapted, after the foldable chair 6 is folded, less space in the accommodating chamber b is occupied, and therefore, more space in the accommodating chamber b can be arranged at will. In addition, after the foldable chair 6 is folded, folding of the side-opening child car chassis 1 is not affected. Through the foldable chair lock machine 7 between the foldable chair 6 and the main load-supporting chassis 1, the foldable chair 6 can be fixed on the main load-supporting chassis 1 and is stably mounted with high safety. In addition, since the foldable chair 6 is detachably mounted on the main load-supporting chassis 11, the foldable chair lock machine 7 is configured to unlock the foldable chair 6, after the foldable chair 6 is detached, the space in the accommodating chamber b is enlarged, and the side-opening child car can be used as a shopping car or a camp car. The accommodating chamber b can be expanded as a parent-child game platform. In addition, the foldable chair 6 can be detached, and cleaning is more convenient.

Fourth Embodiment

Figure 23:
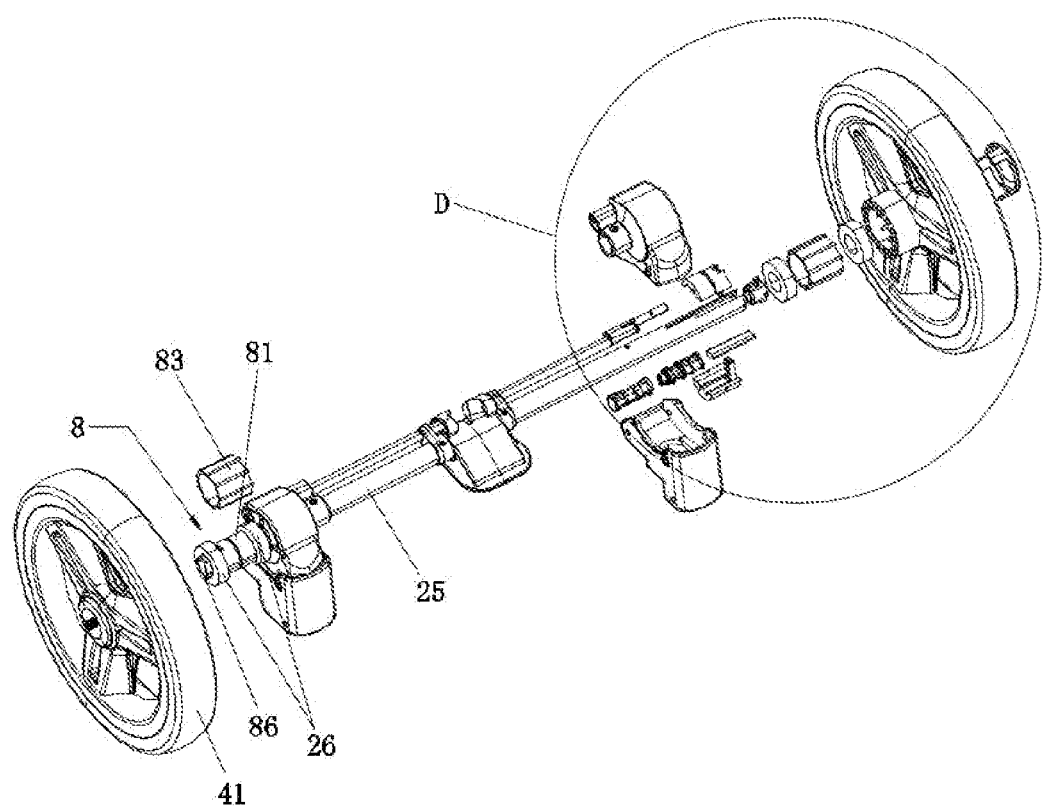
FIG. 23 is a structural schematic view of a deceleration device and rear wheels.
Figure 24:
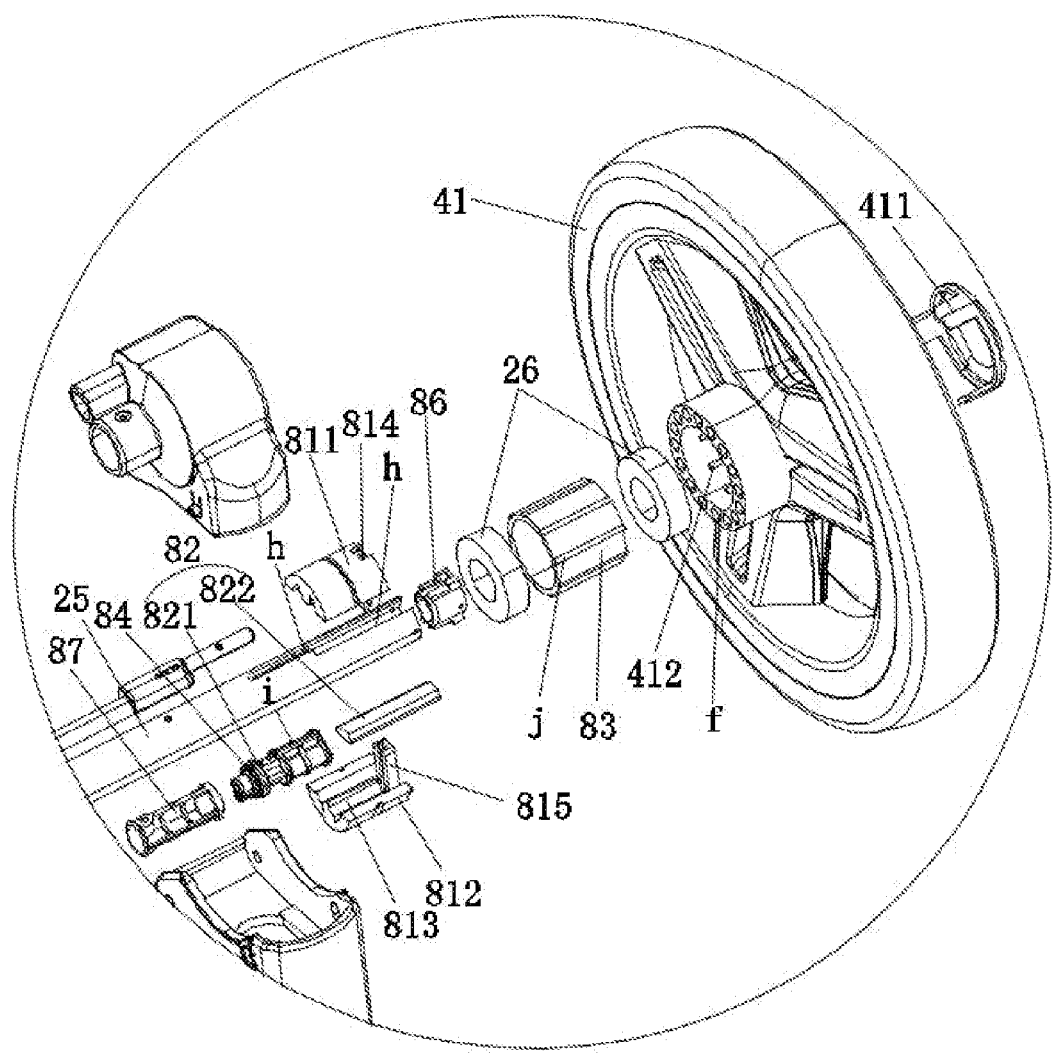
FIG. 24 is an enlarged view of region D in FIG. 0.23.

The present embodiment provides a side-opening child car, based on the second embodiment, as shown in FIG. 7, FIG. 23, and FIG. 24, the side-opening child car further includes a front car bracket 23, a rear car bracket 24, a hollow car axis 25, a telescopic assembly 81, a rotatable assembly 82, a elastic deceleration kit 83, a rope (not shown), a rope pulling assembly 85, and a rope returning spring 84.

The front car bracket 23 is vertically mounted on a top side of two of the car body connection assemblies 13 at the front. The rear car bracket 24 is vertically mounted on a top side of two of the car body connection assemblies 13 at the rear. Each of the wheels 4 has an axial through hole f opened along an axis. Specifically, the axial through hole f penetrates two sides of each of the wheels 4, an outer side of each of the wheels 4 is engaged with a dust-proof cover 411 for enclosing the axial through hole f. The hollow car axis 25 is fixedly mounted on a bottom side of two of the car body connection assemblies 13 at the rear, and since the bearing 26 is rotatable mounted with the wheels 4, the bearing 26 provides a bearing effect and at the same time, the bearing 26 provides a movement space for the telescopic assembly 81 and the elastic deceleration kit 83 to radially move upwards in the axial through hole f A first through slot g is disposed at one end of the hollow car axis 25 inserting into axial through hole f.

The telescopic assembly 81, the rotatable assembly 82, the elastic deceleration kit 83, the rope, the rope pulling assembly 85, and the rope returning spring 84 jointly form a speed reducing device 8. The telescopic assembly 81 is movably mounted on the hollow car axis 2 and is corresponding to the first through slot g, and the rotatable assembly 82 is mounted in the hollow car axis 25 and configured to rotate relative to an axis of the hollow car axis 25 to push the telescopic assembly 81 and the elastic deceleration kit 83 to extend toward an inner wall of the axial through hole f. The elastic deceleration kit 83 is sleeved around the telescopic assembly 81 and configured to be in contact with or extruded with the inner wall of the axial through hole f by being pushed by the telescopic assembly 81 to provide deceleration. One end of the rope is fixed and winds on the rotatable assembly 82, and another end is connected to the rope pulling assembly 85.

The rope pulling assembly 85 is mounted on the rear car bracket 24, more specifically, mounted on a handle 241 of the rear car bracket 24 and configured to pull the rope to unwind the rope to drive the rotatable assembly 82 to rotate. The rope returning spring 84 is mounted in the hollow car axis 25 and on the rotatable assembly 82 and configured to return the rotatable assembly 82 and rope to original positions thereof.

During deceleration, by operation the rope pulling assembly 85 to pull the rope, one end of the rope gradually unwinds from the rotatable assembly 82, thereby driving the rotatable assembly 82 to rotate. One end of the rotatable assembly 82 near the telescopic assembly 81 pushes the telescopic assembly 81 to extend toward the inner wall of the axial through hole f, so that the elastic deceleration kit 83 has expansion deformation and extrudes on the inner wall of the axial through hole f, a relative greater friction opposite to a forward direction of the child car is generated between the elastic deceleration kit 83 and the inner wall of the axial through hole f to provide the deceleration effect, the greater the extruding extent between the elastic deceleration kit 83 and the axial through hole f, the greater the generated deceleration is, and the friction can even provide a brake effect.

By adding the deceleration device 8, a difficulty of deceleration of the side-opening child car can be effectively reduced to achieve a labor-saving effect, the elders can easily operate, and safety guarantee of usage is effectively increased.

Further, as shown in FIG. 24, the rotatable assembly 82 includes a roping column 821 and a pushing rod 822.

The roping column 821 has a recessed portion 8211 provided to be winded by the rope, more specifically, one end of the rope is fixed to the recessed portion 8211 through glue, and afterwards, the rope winds on the recessed portion 8211 for several times. A diameter of the roping column 821 allows the roping column 821 in rotation to fit the inner wall of the hollow car axis 25. The pushing rod 822 is fixedly mounted on one end of the roping column 821 near the telescopic assembly 81 and configured to rotate relative to an axis of the roping column 821 to change a contact position where the pushing rod 822 is in contact with the telescopic assembly 81, and accordingly, a distance between the axis and the contact position gradually increases, so as to push the telescopic assembly 81 to extend. Preferably, a sectional surface of the pushing rod 822 is a rounded rectangle or an ellipse. In the present embodiment, the sectional surface of the pushing rod 822 is a rounded rectangle. The roping column 821 has a mounting hole corresponding in shape with the pushing rod 822 at one end thereof, the pushing rod 822 is inserted in the mounting hole, the roping column 821 has an elongated through slot i opened from an opening of the mounting hole in a radial direction, and the elongated through hole i allows the pushing rod 822 to be conveniently mounted into the mounting hole.

The first through slot g penetrates through two opposite arc surfaces on the hollow car axis 25. The telescopic assembly 81 includes a first arc-shaped push plate 811 and a second arc-shaped push plate 812 that are symmetrically disposed, and each sectional surface of the first arc-shaped push plate 811 and the second arc-shaped push plate 812 is in an arc shape concentric with the hollow car axis 25. Each sectional surface has a protruding block 813 extending from a recessed surface thereof, and the protruding block 813 is placed into the hollow car axis 25 through the first through slot g. Preferably, the protruding block 813 is square with rounded corners.

Further, in order to facilitate the user to preciously operate the rope pulling assembly 85 to avoid excessively pulling the rope and causing the brake to fail.

Figure 25:
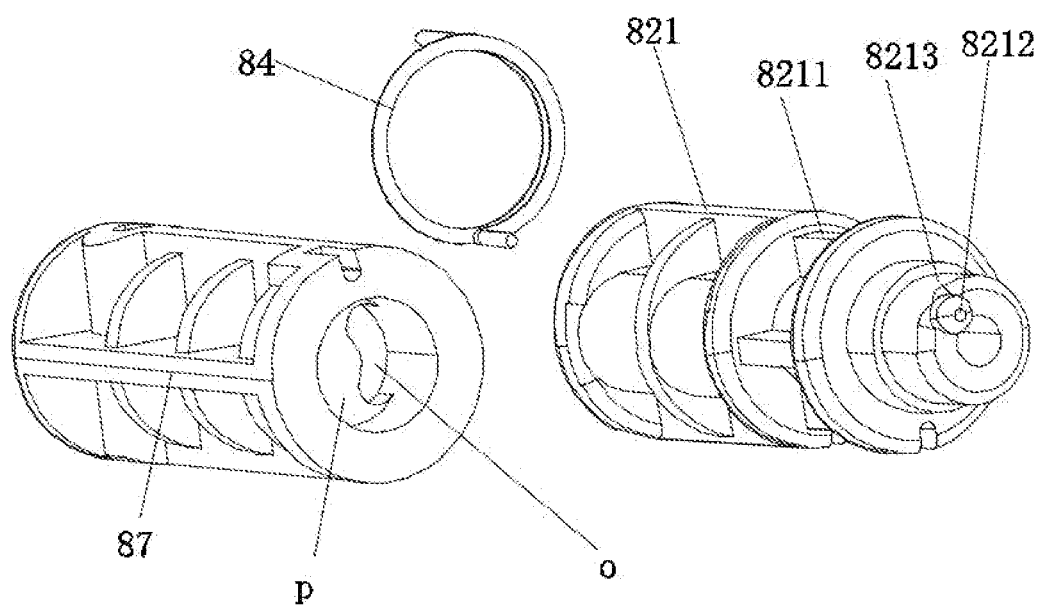
FIG. 25 is a structural schematic view of a rope returning spring, a roping column, and a blocking column.
Figure 26:
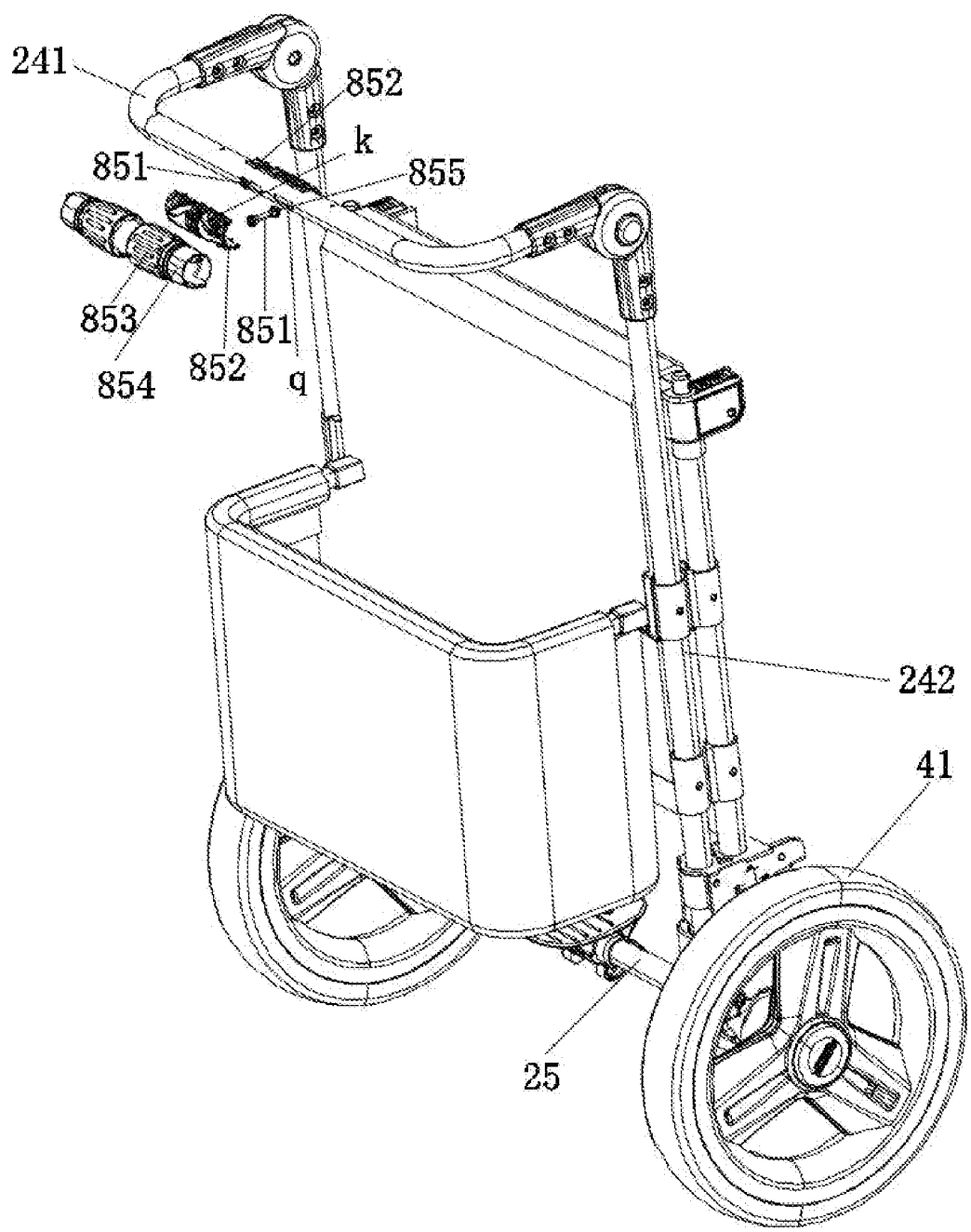
FIG. 26 is a structural schematic view of a tail bracket, a handle, and a rope pulling assembly.

As shown in FIG. 24 and FIG. 25, a blocking column 87 is fixedly disposed on one end of the hollow car axis 25 through a screw, one side of the blocking column 87 and the roping column 821 has an arc angle retaining slot o, the arc angle retaining slot o is a ¼ to ⅙ arc, a protruding point 8212 is disposed at another side, the protruding point 8211 is configured to slide in the arc angle retaining slot o to retain a rotating angle of the roping column 821. The rope returning spring 84 is a torsion spring having one end engaged on the blocking column 87 and another end engaged on the roping column 821.

In the present embodiment, the blocking column 87 has a second insert hole p at one end thereof, the second insert hole p has the arc angle retaining slot o away from an opening, a protruding platform 8213 is disposed at one end of the roping column 821 configured to be inserted with the second insert hole p and configured to relatively rotate. The arc angle retaining slot o is a ¼ arc that retains a rotating angle of the pushing rod 822 is 90 degrees. In an initial state, the pushing rod 832 is parallel to the protruding block 813 and are not in contact, as the pushing rod 822 gradually rotates, rounded corners of the pushing rods 822 are in contact with the protruding blocks 813 and fit with the protruding block 813 in rotation to push the first arc-shaped push plate 811 and the second arc-shaped push plate 812 outwards with the elastic deceleration kit 83 at the same time, and until rotating to a degree, an achieved maximum pushing extent is a maximum deceleration extent.

In order to allow the first arc-shaped push plate 811 and the second arc-shaped push plate 812 to more stably telescopically moves, a first guiding track 814 and a second guiding track 815 are respectively disposed on recessed surfaces of the first arc-shaped push plate 811 and the second arc-shaped push plate 812.

Further, as shown in FIG. 24, in order to enhance deceleration, a plurality of recessed slots j are disposed at one side of an outer periphery of the elastic deceleration kit 83 and the axial through hole f of wheel 4, and a protruding portion 412 respectively corresponding to and fitting with the recessed slots j is disposed at another side. In the present embodiment, the recessed slots j are disposed on the elastic deceleration kit 83 and are distributed equidistantly along an outer circumference of the elastic deceleration kit 83. The protruding portion 412 is disposed on the inner wall of the axial through hole f.

Further, as shown in FIG. 23, at least two bearings 26 are provided, the bearings 26 are respectively disposed at two ends of the elastic deceleration kit 83, an outer periphery of the bearings 26 is higher than an outer periphery of the elastic deceleration kit 83, a retaining member 86 is fixedly mounted on an end portion of the hollow car axis 25 near the bearings 26, and the retaining member 26 is configured to retain the movement of the bearings 26 and the deceleration device 8.

Figure 27:
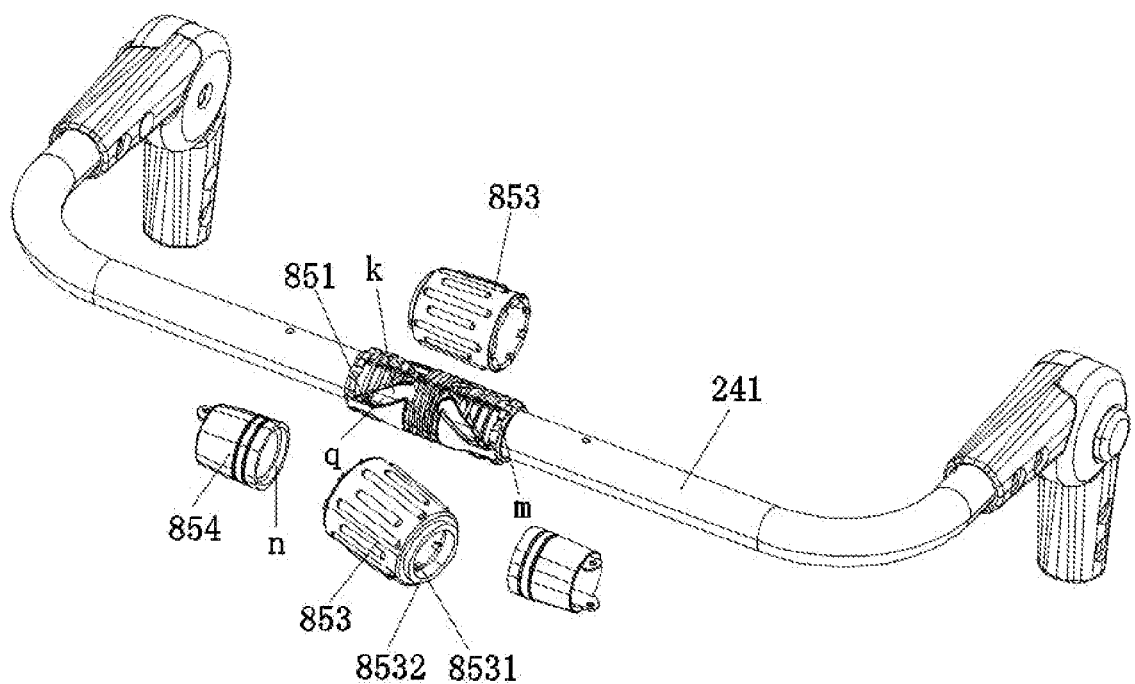
FIG. 27 is a structural schematic view of the handle and the rope pulling assembly.

Further, as shown in FIG. 27, the handle 241 has two symmetrical sliding slots q radially opened thereon, and the rope pulling assembly 85 includes a sliding rod 851, an inward rotating sleeve 852, an outward rotating sleeve 853, and a retaining sleeve 854.

The sliding rod 851 is slidably mounted on the two sliding slots q, one end of the rope away from the rotatable assembly 82 is tied on the sliding rod 851 and in a tight state under the function of the rope returning spring 84. Two ends of the sliding rod 851 are arranged outside of the handle 241 and are fixed with a limiting ring 855, and the limiting ring 855 is configured to prevent the sliding rod 851 from radially sliding. The inward rotating sleeve 852 is rotatably mounted on the handle 241 and has a inclined slot k respectively corresponding to the sliding slots q, an angle is formed between the inclined slot k and the sliding slots q, the sliding rod 851 penetrates through the sliding slots q to be placed into the inclined slot k, the inward rotating sleeve 852 is configured to rotate relative to the handle 241, so that the sliding rods 851 slide along the inclined slot k and the sliding slots q, thereby pulling the rope to unwind from the rotatable assembly 82. The outward rotating sleeve 853 is drivingly connected the outside of the inward rotating sleeve 852, an end portion is mounted on the retaining sleeve 854, the retaining sleeve 854 is sleeved around the handle 241 and fixedly mounted with the handle 241 with a screw, and the outward rotating sleeve 853 is configured for the user to rotate to drive the inward rotating sleeve 852 to rotate.

Specifically, the inward rotating sleeve 852 has a plurality of engaging slots m disposed thereon, the outward rotating sleeve 853 has a plurality of engaging blocks 8531 disposed thereon corresponding to the engaging slots m, and the engaging blocks 8531 are engaged in the engaging slots m to achieve the driving connection of the inward rotating sleeve 852 and the outward rotating sleeve 853. In addition, the outward rotating sleeve 853 has a protruding ring 8532 disposed at one end thereof near the retaining sleeve 854, the retaining sleeve 854 has a mounting slot n at an inner wall thereof corresponding to the protruding ring 8532, the protruding ring 8532 is configured to be rotatably inserted into the mounting slot n to achieve mounting the retaining sleeve 854 with the outward rotating sleeve 853.

Further, the rear bracket 24 includes a tail bracket 242, the handle 241 is mounted on a top portion of the tail bracket 242, the tail bracket 242 and the handle 241 are both in a hollow structure, and the hollow car axis 25 has a second through slot h that is axially opened, in spatial communication with the rotatable assembly 82, and configured to be penetrated by the rope.

It is worth mentioning that, two ends of the hollow car axis 25 are mounted on two rear wheels 41 through the bearing 26, there are two sets of the deceleration devices 8 symmetrically mounted on the two rear wheels 41, and the outward rotating sleeves 853 of the rope pulling assemblies 85 of the two sets of deceleration devices 8 are engaged with each other to achieve synchronized rotation.

The working principle of the present embodiment is substantially described as follows. When using the deceleration device 8, an operator applies an outer force to rotate the outward rotating sleeve 853, the outward rotating sleeve 853 drives the inward rotating sleeve 852 to rotate relative to the handle 241, so that the sliding rod 851 slides along the sliding slot q under the function of the inclined slot k, thereby pulling the rope to gradually unwind from the roping column 821, the roping column 821 in rotation fits with the hollow car axis 25 and drives the pushing rod 822 to rotate, as the pushing rod 822 gradually rotates, the rounded corners of the pushing rods 822 are in contact with the protruding block 813 and fits with the protruding block 813 to rotate to push the first arc-shaped push plate 811 and the second arc-shaped push plate 812 outwards with the elastic deceleration kit 83 at the same time, so that the elastic deceleration kit 83 is in contact with and extrudes with the inner wall of the axial through hole f to achieve the deceleration effect, the extent of deceleration depends on the travel amount of the first arc-shaped push plate 811 and the second arc-shaped push plate 812 in expansion, in other words, after the pushing rod 822 rotates to 90 degrees, the protruding point 8212 of the roping column 821 is retained by the arc angle retaining slot o on the blocking column 87, the pushing rod 822 is stopped, and the pushed maximum extent that the first arc-shaped push plate 811 and the second arc-shaped push plate 812 achieve is the maximum deceleration extent.

The operator withdraws the force applied on the outward rotating sleeve 853, under the function of the spring, the roping column 821 and the pushing rod 822 rotate and return to original positions, the rope returns to wind on the roping column 821 for several times and pulls the sliding rod 851 to slide along the sling slot q, and the pushing rod 851 pushes the inward rotating sleeve 852 and the outward rotating sleeve 853 to return to original positions. In addition, the elastic deceleration kit 83 under its resilience pushes the first arc-shaped push plate 811 and the second arc-shaped push plate 812 to shrink and return to original positions.

Fifth Embodiment

The present embodiment refers to a side-opening child car, the difference between the present embodiment and the fourth embodiment is that the rotatable assembly 82 includes a roping column 821, a fixing axis, and a pushing rod 822. The roping column 821 includes a recessed portion 8211 provided to be winded by the rope, specifically, one end of the rope is fixed to the recessed portion 8211 through glue, and the rope winds on the recessed portion 8211 for several times. A diameter of the roping column 821 allows the roping column 821 in rotation to fit the inner wall of the hollow car axis 25. One end of the fixing axis is fixedly connected to one end of the roping column 821 near the telescopic assembly 81, and the pushing rod 822 is fixedly mounted on another end and is vertical with the fixing rod and in a shape of the letter "T". Preferably, two ends of the pushing rod 822 are hemispherical.

The first through slot g penetrates through two opposite arc surfaces on the hollow car axis 25. The telescopic assembly 81 includes a first arc-shaped push plate 811 and a second arc-shaped push plate 812 that are symmetrically disposed, each sectional surface of the first arc-shaped push plate 811 and the second arc-shaped push plate 812 is in an arc shape concentric with the hollow car axis 25, each recessed surface has a protruding portion 412, the protruding portion 412 increasingly extends along a movement direction of the pushing rod 822, and two protruding portions 412 are placed into the hollow car axis 25 through the first through slot g.

The handle 241 has two symmetrical sliding slots q radially opened thereon, the rope pulling assembly 85 includes a sliding rod 851 and a pushing handle. The sliding rod 851 is slidably mounted on the two sliding slots q, one end of the rope away from the rotatably assembly 82 is tied on the sliding rod 851, and the rope is in a tight state under the function of the rope returning spring 84. The pushing handle is mounted on two ends of the sliding rod 851, so as to prevent the pushing rod 822 from axially moving, and the pushing handle is provided to be pushed by the operator, so that the sliding rod 851 slides along the sliding slots q to pull the rope.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A side-opening child car chassis, comprising:
a main loading-supporting chassis including a middle protective chassis, a front chassis and a rear chassis, wherein the front chassis and the rear chassis are respectively and rotatably mounted on a front side and a rear side of the middle protective chassis, and wherein each of the front chassis and the rear chassis is configured to vertically rotate around the middle protective chassis, and the front chassis, the rear chassis, and the middle protective chassis are arranged at a same level after the front chassis and the rear chassis are expanded;
four car body connection assemblies, wherein two of the four car body connection assemblies are respectively and rotatably connected to a left end and a right end of a front side of the front chassis, and another two of the four car body connection assemblies are respectively and rotatably connected to a left end and a right end of a rear side of the rear chassis, and wherein each of the front chassis and the rear chassis is configured to vertically rotate around corresponding car body connection assemblies;
two sets of stabilizer brackets, wherein one set of the stabilizer brackets is mounted on a left side of a bottom portion of the main load-supporting chassis, another set of the stabilizer brackets is mounted on a right of the bottom portion of the main load-supporting chassis, each of the two sets of stabilizer brackets that is in an expanded state has a V shape, with a tip facing inwards; wherein each of the two sets of the stabilizer brackets includes two reinforcement rods hinged to each other, one end of one of the two reinforcement rods is rotatably connected to one of the two car body connection assemblies that are connected to the front side of the front chassis, one end of another one of the two reinforcement rods is rotatably connected to one of the two car body connection assemblies that are connected to rear side of the rear chassis, and the two reinforcement rods are configured to horizontally rotate around corresponding car body connection assemblies;
a reinforcement member locking device disposed at a hinge position between the middle protective chassis and the reinforcement rods, and configured to lock the reinforcement rods at a bottom side of the middle protective chassis; and an unlocking device configured to control the reinforcement member locking device to lock or to unlock.

2. The side-opening child car chassis according to claim 1, wherein the two sets of the stabilizer brackets have a height difference therebetween so as to prevent the two sets of the stabilizer brackets from interfering with each other when the side-opening child car chassis is folded.

3. The side-opening child car chassis according to claim 1, wherein each of a left side and a right side of the middle protective chassis has a limiting block disposed thereon so as to correspondingly cover a rotation part of each of the front chassis and the rear chassis, and an upper side of the limiting block is sealed and a lower side of the limiting block is open so as to prevent each of the front chassis and the rear chassis from rotating upwards relative to the middle protective chassis.

4. The side-opening child car chassis according to claim 1, wherein a hinge piece is fixedly disposed at the hinge position of the reinforcement rods, the two reinforcement rods of each of the two sets of stabilizer brackets are hinged to each other through the hinge piece, and the hinge piece has a keyhole arranged thereon;

wherein, the reinforcement member locking device includes:

two sets of lock pins each mounted on the bottom side of the middle protective chassis and penetrating through the keyhole of the stabilizer bracket so as to prevent the stabilizer bracket from folding inwards when the side-opening child car chassis is in the expanded state; and a chassis lock mounted on the bottom side of the middle protective chassis, wherein one end of the chassis lock has a chassis lock sleeve configured to be sleeved around the hinge piece, and the chassis lock is configured to lock the stabilizer bracket on the bottom side of the middle protective chassis so as to prevent the middle protective chassis from being lifted upwards relative to the stabilizer bracket;

wherein one end of the unlock device is connected to the chassis lock, another end of the unlock device is configured to be operated by a user, so as to drive the chassis lock to be sleeved around the hinge piece to achieve locking, or to drive the chassis lock to be disengaged from the hinge piece to achieve unlocking.

5. The side-opening child car chassis according to claim 4, wherein a first positioning piece and a second positioning piece are fixedly mounted on a bottom side of the hinge position that is corresponding to one side of the front chassis near the chassis lock and one side of the rear chassis near the chassis lock, the first positioning piece has a first positioning hole opened thereon, and the second positioning hole has a second positioning hole opened thereon;

wherein the chassis lock penetrates through the first positioning hole and is configured to move left and right along the first positioning piece, the chassis lock has a rotatable rod disposed on another end thereof, and a plurality of first inclined turning blocks are spaced apart with each other at an outer periphery of the rotatable rod;

wherein the unlock device includes:

a knob arranged on an outer side of the second positioning piece;

a rotatable sleeved rod having one end fixedly connected to the knob and another end penetrating through the second positioning hole; wherein the rotatable sleeved rod is rotatably sleeved around the movable rod and configured to rotate in the second position hole;

a plurality of second inclined turning blocks spaced apart with each other at an outer periphery of the rotatable sleeved rod; wherein the plurality of second inclined turning blocks are configured to correspondingly abut against the first inclined turning blocks in a locked state, and to be misaligned with the first inclined turning blocks in an unlock state;

a spring limiting member disposed on one of the first inclined turning blocks; and a chassis lock spring arranged between the spring limiting member and the first positioning piece;

wherein, after rotating the knob, the second inclined turning blocks are correspondingly misaligned with the first inclined turning blocks, and the chassis lock moves outwards under resilience of the chassis lock spring, so that the chassis lock is disengaged from the hinge piece.

6. The side-opening child car chassis according to claim 5, wherein each of the chassis lock sleeve and the first positioning hole has a cutting surface.

7. The side-opening child car chassis according to claim 5, wherein a surface area of the knob is greater than a surface area of the second positioning hole, a limiting ring that faces an inner side of the second positioning piece is disposed on the rotatable sleeved rod, so as to prevent the knob from slipping off from the second positioning piece.

8. A side-opening child car, comprising:

the side-opening child car chassis as claimed in claim 1;

a chassis horizontal rod horizontally mounted between the two car body connection assemblies respectively connected to the left end and the right end of the front chassis of the side-opening child car chassis;

a tie rod rotatably mounted on the chassis horizontal rod;

four vertical rods respectively and vertically mounted on a top side of each of the four car body connection assemblies;

a fabric layer surroundingly disposed among the four vertical rods and laid on a top side of the side-opening child car chassis; and four wheels respectively disposed on a bottom side of each of the four car body connection assemblies.

9. The side-opening child car according to claim 8, further comprising:

a foldable chair arranged in an accommodating chamber surrounded by the fabric layer and detachably mounted on a top side of the main load-supporting chassis; and a foldable chair locking machine disposed between the foldable chair and the main load-supporting chassis, wherein the foldable chair locking machine is configured to lock the foldable chair onto the main load-supporting chassis and configured to unlock the foldable chair.

10. The side-opening child car according to claim 8, wherein each of the four wheels has an axial through hole opened along an axis;

wherein the side-opening child car further includes:

a front car bracket correspondingly and vertically mounted on a top side of each of the two car body connection assemblies respectively connected to the left end and the right end of the front chassis of the side-opening child car chassis;

a rear car bracket correspondingly and vertically mounted on a top side of each of the two car body connection assemblies respectively connected to the left end and the right end of the rear chassis of the side-opening child car chassis;

a hollow car axis rotatably mounted to two of the four wheels away from the tie rod through a bearing, wherein the hollow car axis has a first through slot arranged thereon;

a telescopic assembly corresponding to the first through slot and movably mounted on the hollow car axis;

a rotatable assembly mounted in the hollow car axis and configured to rotate around an axis of the hollow car axis, so as to push the telescopic assembly and an elastic deceleration kit to extend toward an inner wall of the axial through hole;

the elastic deceleration kit sleeved around the telescopic assembly and configured to be in contact with or extruded with the inner wall of the axial through hole by being pushed by the telescopic assembly to provide deceleration;

a rope having one end fixed and wound on the rotatable assembly, and another end connected to a rope pulling assembly;

the rope pulling assembly mounted on the rear car bracket and configured to pull the rope to unwind the rope to drive the rotatable assembly to rotate; and a rope returning spring mounted in the hollow car axis and on the rotatable assembly and configured to return the rotatable assembly and rope to original positions thereof.

\* \* \* \* \*